(12) United States Patent
Tanaka et al.

(10) Patent No.: US 12,343,913 B2
(45) Date of Patent: Jul. 1, 2025

(54) RESIN MOLDED MEMBER AND MANUFACTURING METHOD THEREOF

(71) Applicant: KYB Corporation, Tokyo (JP)

(72) Inventors: Youji Tanaka, Nagano (JP); Kenta Kurihara, Aichi (JP)

(73) Assignee: KYB CORPORATION, Tokyo (JP)

( * ) Notice: Subject to any disclaimer, the term of this patent is extended or adjusted under 35 U.S.C. 154(b) by 137 days.

(21) Appl. No.: 18/255,705

(22) PCT Filed: Dec. 10, 2021

(86) PCT No.: PCT/JP2021/045699
§ 371 (c)(1),
(2) Date: Jun. 2, 2023

(87) PCT Pub. No.: WO2022/124417
PCT Pub. Date: Jun. 16, 2022

(65) Prior Publication Data
US 2024/0033981 A1    Feb. 1, 2024

(30) Foreign Application Priority Data
Dec. 11, 2020   (JP) ................................ 2020-205642

(51) Int. Cl.
*B29C 45/14*     (2006.01)
*B29L 15/00*     (2006.01)

(52) U.S. Cl.
CPC .. *B29C 45/14631* (2013.01); *B29C 45/14786* (2013.01); *B29L 2015/003* (2013.01)

(58) Field of Classification Search
None
See application file for complete search history.

(56) References Cited

U.S. PATENT DOCUMENTS

2017/0120519 A1\*   5/2017  Mark ..................... B33Y 70/00
2017/0239883 A1     8/2017  Terada et al.

FOREIGN PATENT DOCUMENTS

| JP | 2004 082 470 | | \* | 3/2004 |
| JP | 2004 082 470 | A | \* | 3/2004 |
| JP | 2015 221 511 | A | \* | 12/2015 |
| JP | 2017-149268 | A | | 8/2017 |
| JP | 2019-104138 | A | | 6/2019 |

\* cited by examiner

*Primary Examiner* — Mohammad M Ameen
(74) *Attorney, Agent, or Firm* — Rabin & Berdo, P.C.

(57) ABSTRACT

A manufacturing method of a resin molded member includes: an insert member molding step of building an insert member by stacking layers of a base resin containing continuous fibers by using a 3D printer; an aligning step of aligning the insert member in a cavity of an injection molding mold; and a resin portion molding step of molding a resin portion integrated with the insert member by filling an injection molding resin into the cavity, wherein the insert member is arranged on a surface of a weld portion by the resin portion molding step, and the continuous fibers in the insert member are oriented in direction crossing over the weld portion, the weld portion being formed in the resin portion.

17 Claims, 16 Drawing Sheets

RESIN MOLDED MEMBER AND MANUFACTURING METHOD THEREOF

TECHNICAL FIELD

The present invention relates to a resin molded member that is molded of a resin containing continuous fibers and a manufacturing method of the same.

BACKGROUND ART

As materials for the manufacture of a resin molded member, resin materials containing various types of fibers are used. For example, a resin molded member with an increased strength and wear resistance is manufactured by adding glass fibers, carbon fibers, aramid fibers, and so forth to a resin used for an injection molding, by injecting and filling the resin into a mold, and by curing the resin.

In a case in which continuous fibers are used as reinforcing fibers, in an injection molding apparatus, the continuous fibers are broken down during the kneading of the resin material containing the continuous fibers with screws. In addition, when the resin material is filled into a cavity through a nozzle and a gate, the continuous fibers are broken down due to shearing stress applied to the resin material. Thus, fiber lengths of the continuous fibers cannot be maintained, and there is a problem in that a reinforcing effect is deteriorated.

In addition, if glass fibers or basalt fibers are mixed as the reinforcing fibers in a molded item having a sliding part that slides with a counterpart member, the counterpart member is worn out. Thus, it is considered to mix fibers that increase a wear resistance (for example, the carbon fibers or the aramid fibers) together. However, if different kinds of fibers are mixed together, the one type of fibers attack the other type of fibers during the kneading and the filling and their characteristics cancel each other out, and thereby, the strength and the wear resistance are also deteriorated.

JP2019-104138A describes a manufacturing method of the resin molded member in which the resin is filled into the mold after the continuous fibers are arranged therein. In JP2019-104138A, a composite material is preformed by impregnating continuous reinforcement fibers into the resin, and the composite material is inserted into the mold and the mold is closed, and thereby, the composite material is caused to follow the shape of the mold cavity.

SUMMARY OF INVENTION

In JP2019-104138A, the composite material containing the continuous fibers is used as an insert member, and a thermoplastic resin for an injection molding is filled on both sides of the insert member to integrate them with each other. By doing so, it is possible to avoid the breaking down of the continuous fibers and interaction between fibers during the kneading and/or the injection/filling of the resin material. However, the insert member in JP2019-104138A is a flexible sheet or cloth-like member. Thus, it is difficult to precisely arrange the oriented continuous fibers to reinforcing points. Especially, it is difficult to arrange the continuous fibers to a part having a complex shape and a part having a fine shape.

An object of the present invention is to increase a reinforcing effect achieved when a resin molded member is reinforced by using an insert member including continuous fibers.

According to one aspect of the present invention, A manufacturing method of a resin molded member comprises: an insert member molding step of building an insert member by stacking layers of a base resin containing continuous fibers by using a 3D printer; an aligning step of aligning the insert member in a cavity of an injection molding mold; and a resin portion molding step of molding a resin portion integrated with the insert member by filling an injection molding resin into the cavity, wherein the insert member is arranged on a surface of a weld portion by the resin portion molding step, and the continuous fibers in the insert member are oriented in direction crossing over the weld portion, the weld portion being formed in the resin portion.

According to another aspect of the present invention, A resin molded member comprises: an insert member in which layers of a base resin containing continuous fibers are stacked; and a resin portion integrally formed with the insert member, wherein the insert member is arranged on a surface of a weld portion formed in the resin portion, and the continuous fibers in the insert member are oriented in direction crossing over the weld portion.

DESCRIPTION OF EMBODIMENTS

A resin molded member of the present invention is a molded item that is manufactured by an injection molding using a mold. In a first embodiment described below, the resin molded member is a resin gear 1 in which a hole portion for passing through a rotation shaft is formed at the center and a tooth portion is formed on an outer circumferential surface. In addition, in a second embodiment, the resin molded member is a spring guide 30 of a suspension device 40 that is provided between a vehicle body and a wheel of a vehicle.

Note that the present invention is not limited to the embodiments described below. For example, in the first embodiment which will be described below, although the hole portion is formed as a through hole, the hole portion may not be a through hole, and it may be a recessed portion. In addition, in the first embodiment which will be described below, although the tooth portion is formed over the entire circumference, the tooth portion may be formed only partially along the circumferential direction. In addition, in the first embodiment which will be described below, although the resin molded member includes both of the hole portion and the tooth portion, the resin molded member may include only one of the hole portion and the tooth portion. In a case in which the tooth portion is not provided, the resin molded member may not be a gear. In other words, the present invention can be applied to any resin molded member that includes the hole portion. For example, the present invention can be applied to a pulley.

First Embodiment (Configuration of Resin Gear)

Figure 1:
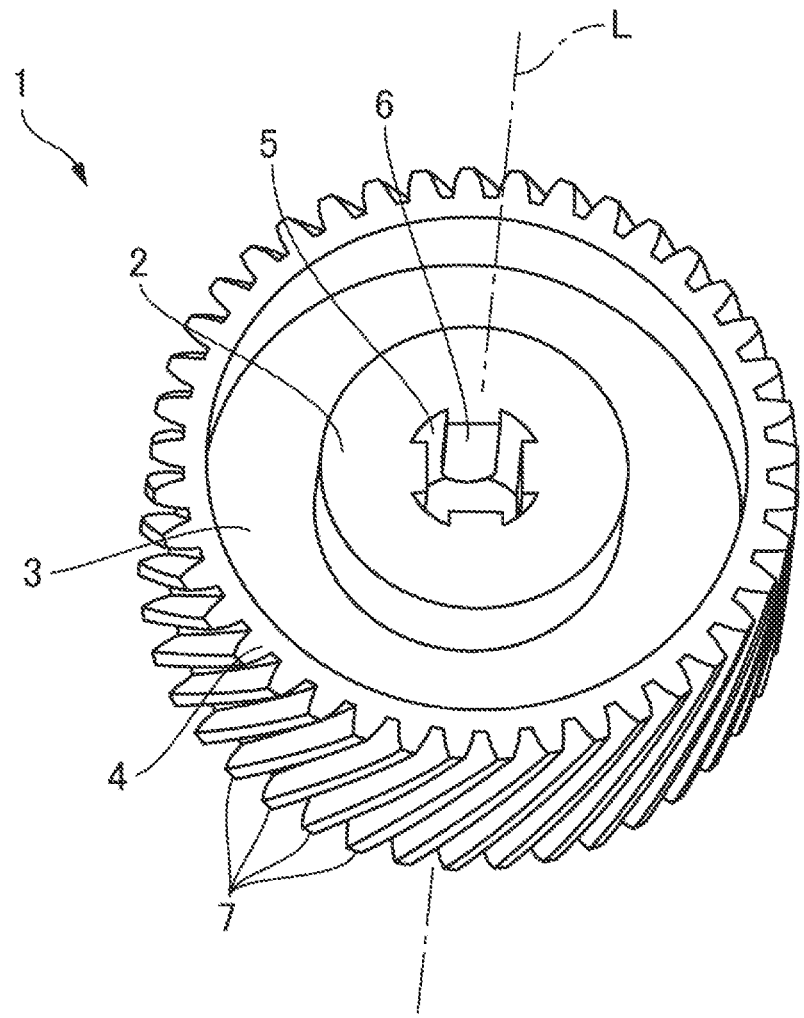
FIG. 1 is a perspective view of a resin gear according to an embodiment of the present invention.
Figure 2A:
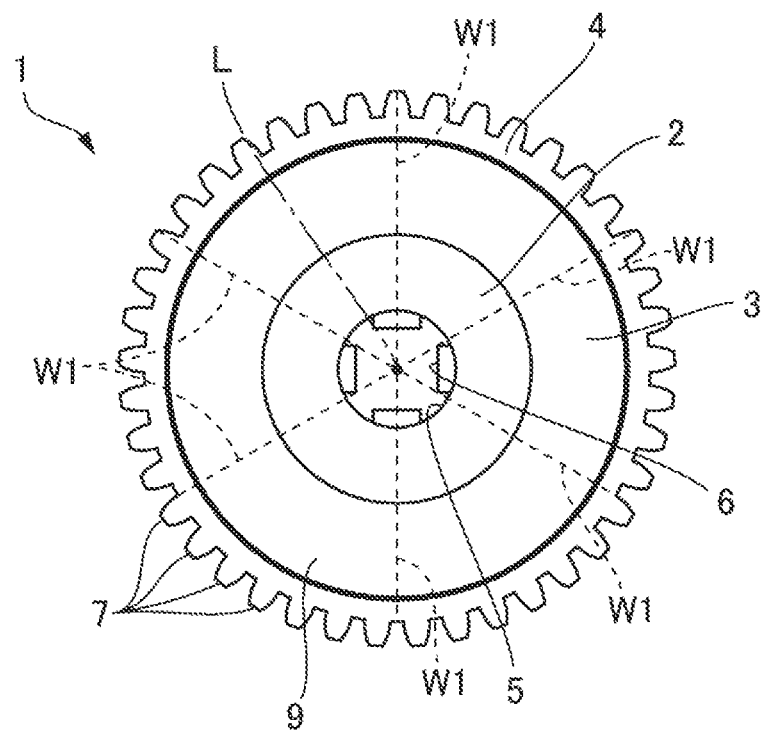
FIG. 2A is a plan view of the resin gear.
Figure 2B:
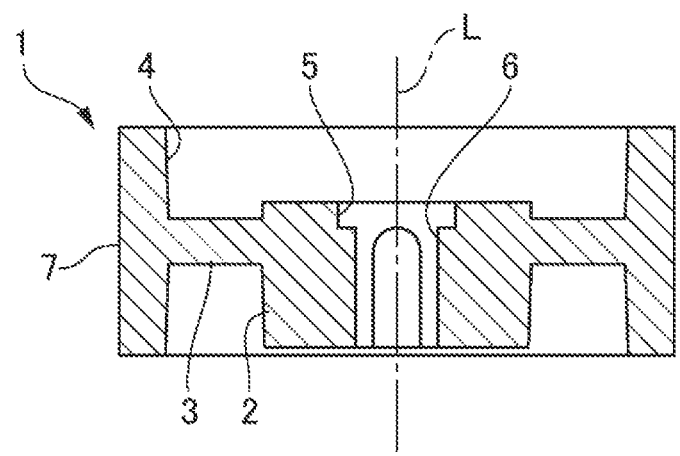
FIG. 2B is a sectional view of the resin gear.
Figure 3A:
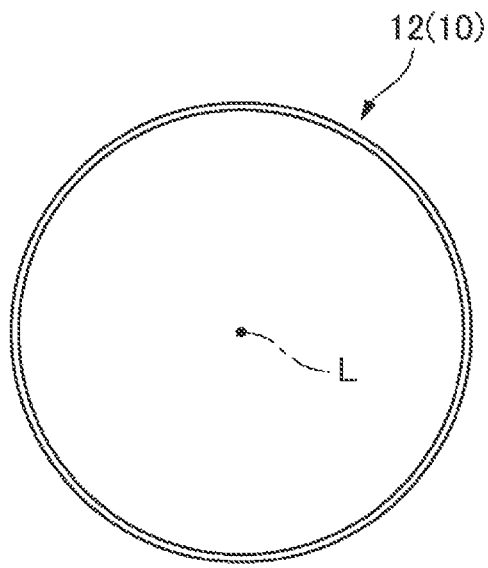
FIG. 3A is a plan view of an outer insert sleeve.
Figure 3B:
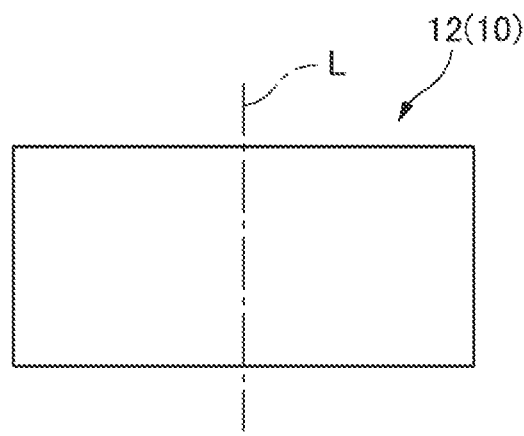
FIG. 3B is a side view of the outer insert sleeve.
Figure 3C:
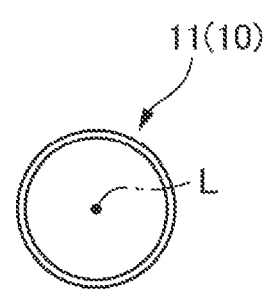
FIG. 3C is a plan view of an inner insert sleeve.
Figure 3D:
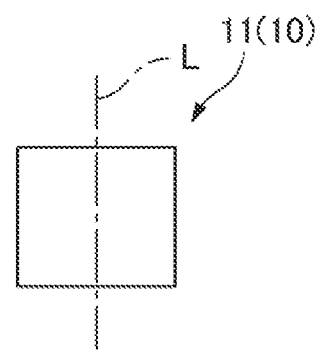
FIG. 3D is a side view of the inner insert sleeve.

FIG. 1 is a perspective view of the resin gear 1 to which the present invention is applied. FIG. 2(A) is a plan view of the resin gear 1 shown in FIG. 1, and FIG. 2(B) is a sectional view of the resin gear 1 shown in FIG. 1. As shown in FIGS. 1 and 2, the resin gear 1 includes: a tubular boss portion 2; a ring-shaped connecting portion 3 that is formed on an outer circumference of the boss portion 2; and a ring-shaped outer circumference portion 4 that is formed on an outer circumference of the connecting portion 3. The outer circumference portion 4 is arranged coaxially with the boss portion 2. In the first embodiment, L is assigned to the center axis is of the resin gear 1, and the direction along the center axis L is referred to as the axial direction.

The resin gear 1 includes a hole portion 5 that penetrates through the boss portion 2 in the axial direction. An inner circumferential surface of the hole portion 5 is formed with projected portions 6 each serves as a rotation-restricting portion when the resin gear 1 is linked to a rotating shaft. In addition, the resin gear 1 includes a tooth portion that is formed on the outer circumferential surface of the outer circumference portion 4. The tooth portion includes a plurality of teeth 7 that are arranged along the circumferential direction. The resin gear 1 is a helical gear, and the teeth 7 extend in the inclined direction relative to the axial direction. Note that the resin gear 1 may be a spur gear, and the teeth 7 may extend in the parallel direction relative to the axial direction. In addition, the resin gear 1 may be an intermittent gear in which the tooth portion is formed only partially along the circumferential direction. In addition, the shape of the rotation-restricting portion that is provided on the inner circumferential surface of the hole portion 5 may be different from that in the first embodiment. For example, the rotation-restricting portion may have a D-cut shape.

When a molded item having a hole, such as the resin gear 1, is manufactured by the injection molding, a weld portion is formed at a position where fronts of the resin flowing around a pin for forming the hole meet together during the filling of the resin into the mold. Because the weld portion is formed at a position where there are counter-flows of the resin, even if continuous fibers are added to an injection molding resin, the orientation of the continuous fibers is made non-uniform in the weld portion. In addition, in a case in which the molded item has a shape with fine projections and recesses as in the resin gear 1, or in a case in which the molded item has a complex shape, even if the continuous fibers are added to the injection molding resin, the fibers cannot be uniformly aligned along the mold shape, and so, deterioration of a reinforcing effect is caused. In the resin gear 1 of the first embodiment, in order to solve these issues, reinforcement is performed by using an insert members 10 that is manufactured by using a 3D printer.

(Manufacturing Method of Resin Gear)

The resin gear 1 is manufactured by the insert molding in which the insert members 10 made of resin (see FIGS. 3A to 3D) are arranged in the mold and the resin is filled into the mold. Therefore, the resin gear 1 includes the insert members 10 and a resin portion 9 that is integrated with the insert members 10. As described later, when the injection molding resin is filled, the insert member 10 is deformed by the heat and pressure of the injection molding resin and is brought into close contact with the mold surface of an injection molding mold 20, and thereby, the shape of the mold surface is transferred to the insert member 10. Therefore, the insert members 10 form surface portions of the finished resin gear 1.

As described later, the resin portion 9 formed of the injection molding resin includes first weld portions W1 and second weld portions W2. The first weld portions W1 are weld lines that radially extend from the hole portion 5 (see FIGS. 2A and 6C). In addition, the second weld portions W2 are formed at dedenda 8 of the tooth portion provided in the outer circumference portion 4 (see FIG. 7C). In the first embodiment, the first weld portions W1 and the second weld portions W2 are reinforced with the insert members 10 arranged at surface portions of the resin gear 1.

(Insert Member)

FIG. 3 shows plan views and side views of the insert member 10. In the first embodiment, two members, a first insert member and a second insert member, are used as the insert members 10. The first insert member is an inner insert sleeve 11, and the second insert member is an outer insert sleeve 12. Two members, the inner insert sleeve 11 and the outer insert sleeve 12, are used. FIG. 3A is a plan view of the outer insert sleeve 12, FIG. 3B is a side view of the outer insert sleeve 12. FIG. 3C is a plan view of the inner insert sleeve 11, and FIG. 3D is a side view of the inner insert sleeve 11. The inner insert sleeve 11 has a barrel shape and has a diameter slightly larger than that of the hole portion 5 of the resin gear 1. The height of the inner insert sleeve 11 in the axial direction is substantially the same as that of the boss portion 2. The outer insert sleeve 12 has a barrel shape and has a diameter slightly smaller than the root diameter of the resin gear 1. The height of the inner insert sleeve 11 in the axial direction is substantially the same as that of the outer circumference portion 4.

The insert members 10 are each manufactured by using a 3D printer. The insert member 10 is manufactured by stacking layers of a base resin containing the continuous fibers. The 3D printer includes a support table on which the layers of a molding material containing the base resin are stacked and an injection unit that injects the molding material towards the support table. The support table and the injection unit are controlled such that the molding material is injected while they are relatively moved on the basis of three-dimensional shape data of the insert member 10. By doing so, by controlling the injection position of the molding material, the layers of the molding material are stacked to form a three-dimensional shape of the insert member 10. The layers of the molding material thus stacked are cured to finish the insert member 10.

The base resin is a thermoplastic resin. The insert member 10 is manufactured by using a polyamide resin as the base resin. Other thermoplastic resins may also be used as the base resin. The continuous fibers are fibers that are continuous, such as aramid fibers, carbon fibers, potassium titanate fibers, glass fibers, basalt fibers, and so forth. The inner insert sleeve 11 is built by using the molding material containing the polyamide resin and carbon continuous fibers. In addition, the outer insert sleeve 12 is built by using the molding material containing the polyamide resin and aramid continuous fibers. In other words, for the inner insert sleeve 11 and the outer insert sleeve 12, the same base resin is used, but different continuous fibers are used.

When the insert member 10 is manufactured, the 3D printer can control the orientation of the continuous fibers. When the layers of the molding material are stacked, the continuous fibers are oriented in the direction along a moving path of the injection unit relative to the support table. Therefore, by moving a nozzle on the basis of the three-dimensional shape data of the insert member 10 and orientation data of the continuous fibers at each part of the insert member 10, it is possible to manufacture the insert member 10 in which the continuous fibers are oriented in the desired direction. The inner insert sleeve 11 and the outer insert sleeve 12 both have a barrel shape, and the orientation of the continuous fibers is aligned along the circumferential direction.

(Injection Molding Mold)

Figure 4:
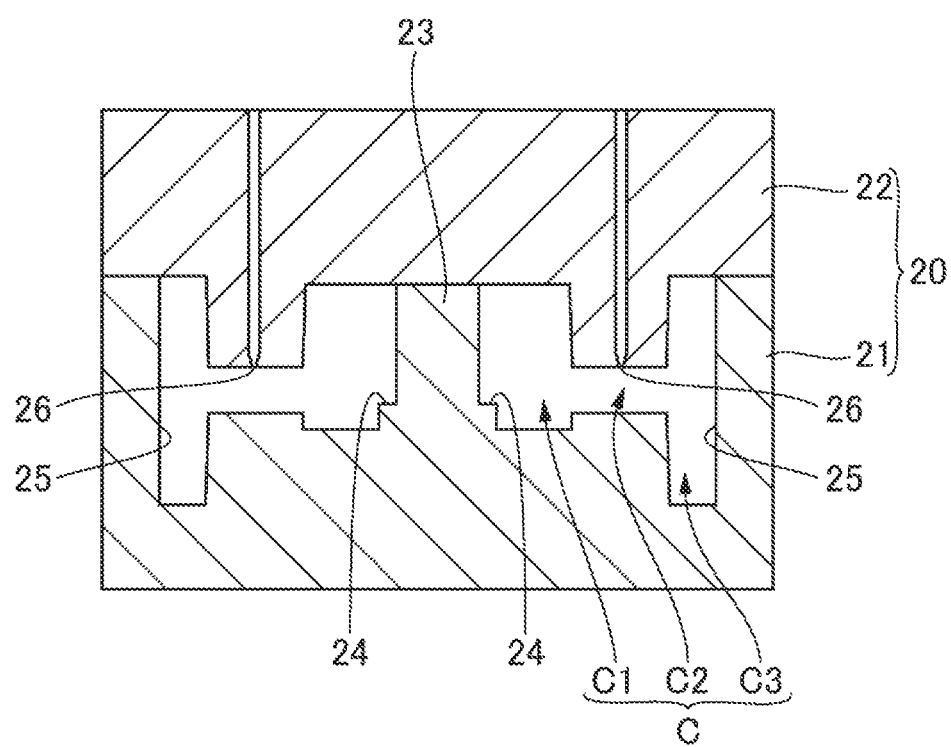
FIG. 4 is a sectional view of an injection molding mold that is used for the manufacture of the resin gear.

FIG. 4 is a sectional view of the injection molding mold 20 that is used for the manufacture of the resin gear 1 shown in FIG. 1. As shown in FIG. 4, the injection molding mold 20 includes a first mold member 21 that is provided so as to be movable and a second mold member 22 that is provided so as to be stationary, and a cavity C is formed by causing the first mold member 21 and the second mold member 22 to come into contact. The injection molding mold includes a center pin 23 that is arranged at the center of the cavity C. The center pin 23 has an inverted shape of the hole portion 5 of the resin gear 1, and recessed portions 24 extending in the axial direction are formed in parts of an outer circumferential surface of the center pin 23 in the axial direction. In addition, the injection molding mold 20 includes a tooth mold portion for molding the tooth portion in the outer circumference portion 4 of the resin gear 1. The tooth mold portion 25 is formed in the first mold member 21. In an inner circumferential surface of the tooth mold portion 25, inverted shapes of the teeth 7 are arranged along the circumferential direction.

Note that the first mold member 21 and the second mold member 22 may each be formed of a plurality of mold members. For example, the center pin 23 of the first mold member 21 may be configured so as to be slidable in the axial direction. In addition, the tooth mold portion 25 may be configured so as to be divided in the circumferential direction.

Figure 5A:
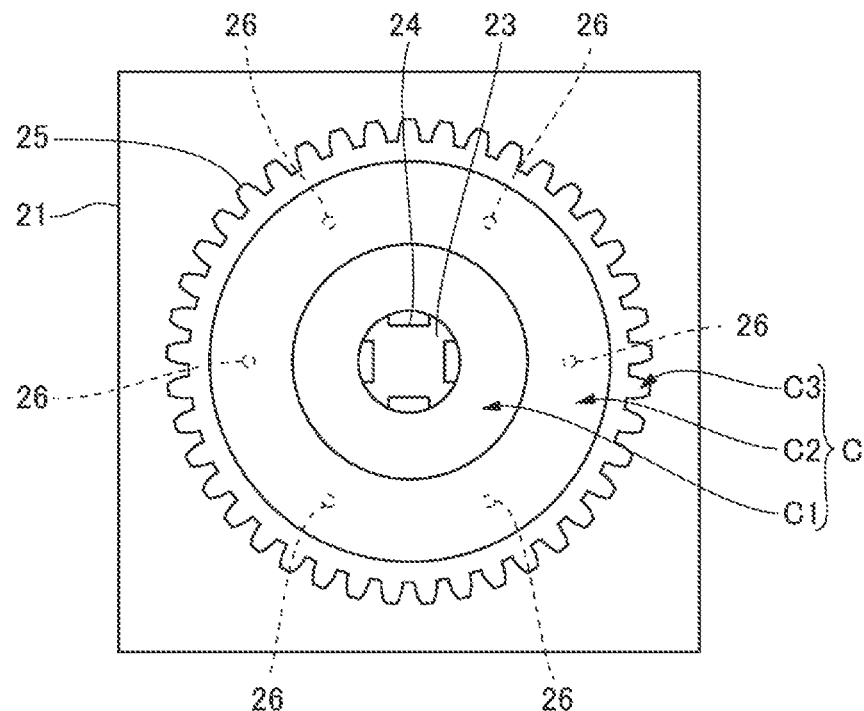
FIG. 5A is a plan view of a cavity of the injection molding mold.
Figure 5B:
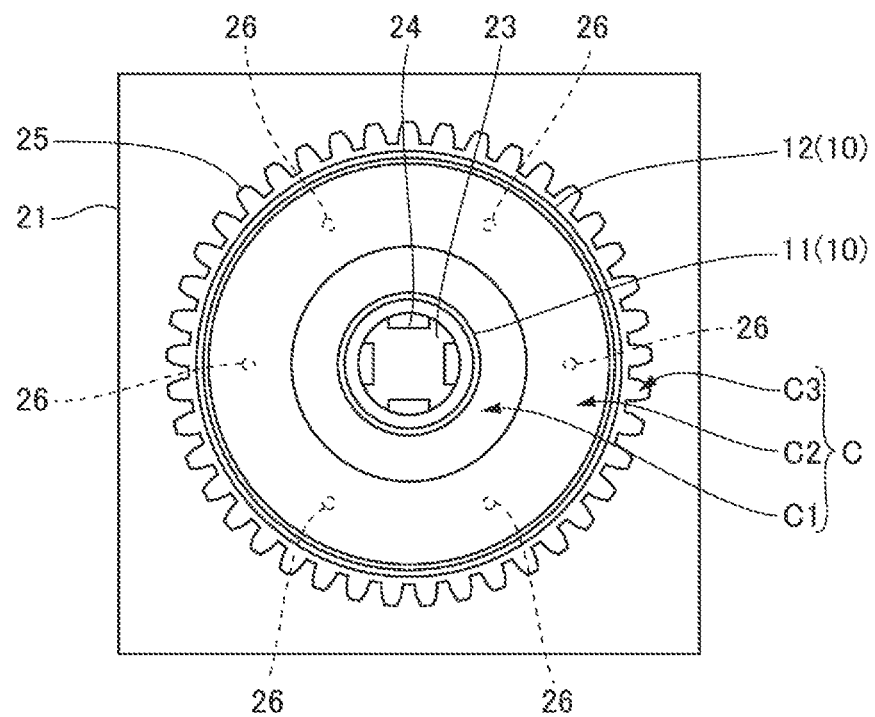
FIG. 5B is a plan view showing arrangement of insert members in the cavity of the injection molding mold.

FIG. 5A is a plan view of the cavity C of the injection molding mold 20, and FIG. is a plan view showing an arrangement of the insert members 10 in the cavity C. As shown in FIGS. 4 and 5, the cavity C includes a tubular first cavity portion C1 that forms the boss portion 2 of the resin gear 1, a second cavity portion C2 that forms the connecting portion 3 of the resin gear 1, and a tubular third cavity portion C3 that forms the outer circumference portion 4 of the resin gear 1. The first cavity portion C1 is connected to the third cavity portion C3 via the second cavity portion C2. As shown in FIG. 5B, the inner insert sleeve 11 is arranged in the first cavity portion C1 and aligned so as to surround the center pin 23 over the entire circumference thereof. In addition, the outer insert sleeve 12 is arranged in the third cavity portion C3 and aligned at the inside of the tooth mold portion 25.

As shown in FIG. 4, the injection molding mold 20 has gates 26 for filling the injection molding resin (the resin material) into the cavity C. The gates 26 are provided in the second cavity portion C2, and the injection molding resin supplied from the gates 26 is filled into the first cavity portion C1 and into the third cavity portion C3 through the second cavity portion C2. As shown in FIG. 5A, in the first embodiment, the gates 26 are provided in the second cavity portion C2 at six locations at equal intervals in the circumferential direction. In such an arrangement of the gates 26, six radially extending weld lines (the first weld portions W1) are respectively formed at middle positions between adjacent gates 26 in the circumferential direction.

In addition, during the manufacture of the resin gear 1, when the injection molding resin is filled into the third cavity portion C3, weld parts (the second weld portions W2) are respectively formed at the dedenda between adjacent teeth 7. In addition, although the illustration is omitted, the weld portion is also formed on each of tooth surfaces of the teeth 7 due to disturbance of resin flow caused by a tooth geometry such as the number of teeth and a helix angle.

The injection molding resin that is used for the molding of the resin portion 9 of the resin gear 1 is the thermoplastic resin. For the resin portion 9, the polyamide resin is used as the injection molding resin. As described above, the base resin forming the insert member 10 is the polyamide resin. Therefore, the injection molding resin and the base resin are the same resin. Other thermoplastic resins may also be used as the injection molding resin.

(Reinforcement of First Weld Portion by Inner Insert Sleeve)

Figure 6A:
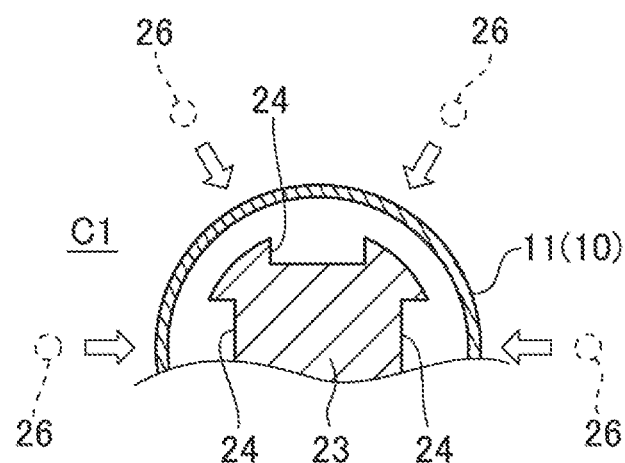
FIG. 6A is a diagram showing a state at which an injection molding resin is being filled into a first cavity portion.
Figure 6B:
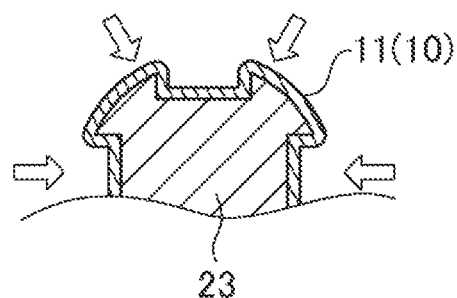
FIG. 6B is a diagram showing a state in which the inner insert sleeve is deformed by heat and pressure of the injection molding resin and is brought into close contact with a center pin.
Figure 6C:
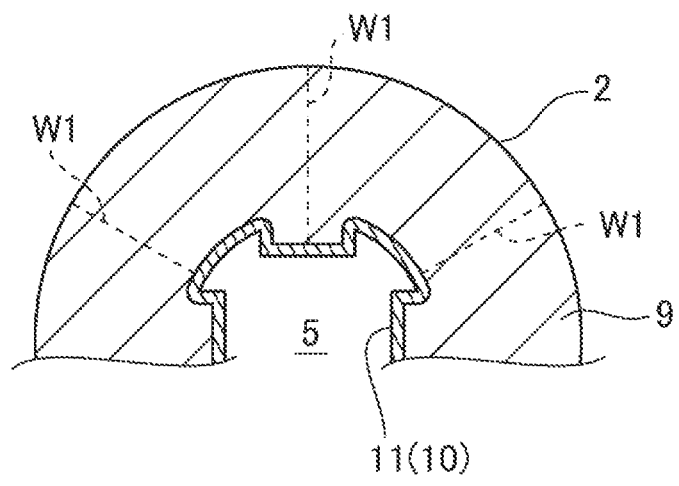
FIG. 6C is a diagram showing a structure of a boss portion of the resin gear after it is separated away from the mold.

FIG. 6 is a diagram showing steps for causing the inner insert sleeve 11 to come into close contact with the center pin 23 by the resin pressure. FIG. 6A shows a state at which the first cavity portion C1 is being filled with the injection molding resin. FIG. 6B shows a state in which the inner insert sleeve 11 is deformed by the heat and pressure of the injection molding resin and is brought into close contact with the center pin 23. FIG. 6C shows the structure of the boss portion 2 of the resin gear 1 after it is separated away from the mold.

As shown in FIG. 6A, the inner insert sleeve 11 is aligned at the inner side of the gates 26. Therefore, as the injection molding resin is charged from the gates 26, the inner insert sleeve 11 is pushed towards the inner side by the resin pressure. As a result, the inner insert sleeve 11 is deformed by the heat and pressure of the injection molding resin, and as shown in FIG. 6B, the inner insert sleeve 11 is brought into close contact with the outer circumferential surface of the center pin 23. Therefore, in the resin gear 1 that has been separated away from the mold, as shown in FIG. 6C, the inner circumferential surface of the hole portion 5 is formed of the inner insert sleeve 11 that has been stretched by the heat and that has been shaped such that the shape of the center pin 23 is transferred thereto.

The continuous fibers contained in the inner insert sleeve 11 are oriented in the circumferential direction. Therefore, the continuous fibers are arranged on the outer circumferential surface of the center pin 23 in a state in which the continuous fibers are oriented in the circumferential direction, and thus, the continuous fibers are arranged so as to cross over the weld lines (the first weld portions W1) that extend in the radial direction. When the resin gear 1 is separated away from the injection molding mold 20, the continuous fibers that are oriented in the circumferential direction are arranged on the inner circumferential surface of the hole portion 5 over the entire circumference thereof. Therefore, because the continuous fibers are arranged for all of the weld lines, which are formed at six locations, so as to cross over the weld lines, all of the weld lines (the first weld portions W1) formed at the six locations are reinforced by the continuous fibers.

(Reinforcement of Second Weld Portion by Outer Insert Sleeve)

Figure 7A:
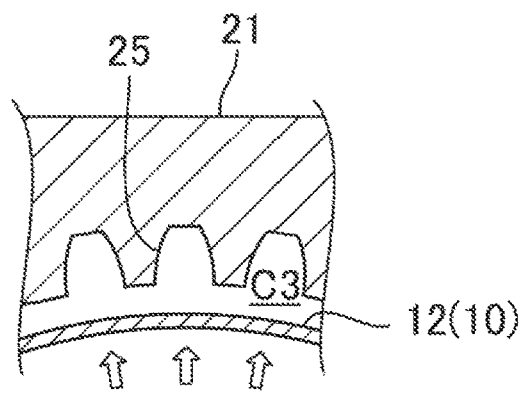
FIG. 7A is a diagram showing a state at which the injection molding resin is being filled into a third cavity portion.
Figure 7B:
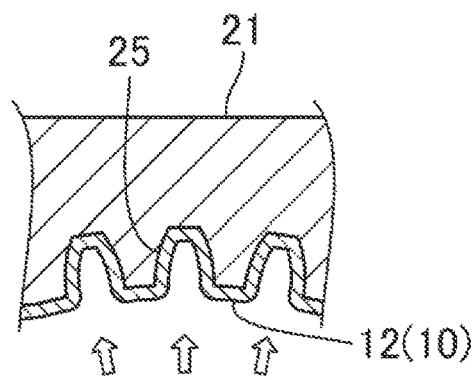
FIG. 7B is a diagram showing a state in which the outer insert sleeve is deformed by the heat and pressure of the injection molding resin and is brought into close contact with a tooth mold portion.
Figure 7C:
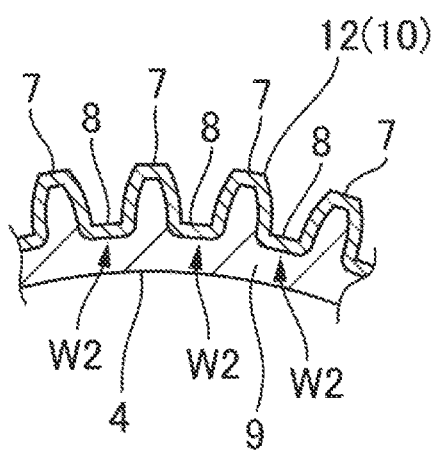
FIG. 7C is a diagram showing a structure of an outer circumference portion of the resin gear after it is separated away from the mold.

FIG. 7 is a diagram showing steps for causing the outer insert sleeve 12 to come into close contact with the tooth mold portion 25 by the resin pressure. FIG. 7A shows a state at which the third cavity portion C3 is being filled by the injection molding resin. FIG. 7B shows a state in which the outer insert sleeve 12 is deformed by the heat and pressure of the injection molding resin and is brought into close contact with the tooth mold portion 25. FIG. 7C shows the structure of the outer circumference portion 4 of the resin gear 1 after it is separated away from the mold.

As shown in FIG. 7A, the outer insert sleeve 12 is aligned at the outside of the gates 26. Therefore, as the cavity C is filled with the injection molding resin, the outer insert sleeve 12 is pushed towards the outer circumferential side by the resin pressure. As a result, the outer insert sleeve 12 is deformed by the heat and pressure of the injection molding resin, and as shown in FIG. 7B, the outer insert sleeve 12 is brought into close contact with the inner circumferential surface of the tooth mold portion 25. Therefore, in the resin gear 1 that has been separated away from the mold, as shown in FIG. 7C, the surface of the tooth portion is formed of the outer insert sleeve 12 that has been stretched by the heat and that has been shaped such that the shape of the tooth mold portion 25 is transferred thereto.

The continuous fibers contained in the outer insert sleeve 12 are oriented in the circumferential direction. Therefore, the continuous fibers are arranged on the inner circumferential surface of the tooth mold portion 25 in a state in which the continuous fibers are oriented in the circumferential direction, and thus, the continuous fibers are arranged so as to cross over the second weld portions W2 that are formed in the dedenda 8. When the resin gear 1 is separated away from the injection molding mold 20, the continuous fibers that are oriented in the circumferential direction are arranged on the outer circumferential surface of the tooth portion. Therefore, because the continuous fibers are arranged so as to cross over the second weld portions W2 formed in the dedenda 8, the second weld portions W2 are reinforced by the continuous fibers.

When the inner insert sleeve 11 and the outer insert sleeve 12 are manufactured by using the 3D printer, if a connecting surface forming a discontinuity of the continuous fibers is formed at a predetermined location in the circumferential direction, when the inner insert sleeve 11 is arranged in the cavity C, the inner insert sleeve 11 is aligned such that a position of the first weld portion W1 in the circumferential direction is shifted from the discontinuity of the continuous fibers in the inner insert sleeve 11 by at least one degree. Similarly, the outer insert sleeve 12 is aligned such that a position of the second weld portion W2 in the circumferential direction is shifted from the discontinuity of the continuous fibers in the outer insert sleeve 12 by at least one degree. With such a configuration, it is possible to avoid deterioration of the reinforcing effect.

(Main Functions and Advantages of First Embodiment)

As described above, the manufacturing method of the resin gear 1 of the first embodiment includes: an insert member molding step of building the insert members 10 by stacking the layers of the base resin containing the continuous fibers by using the 3D printer; an aligning step of aligning the insert members 10 in the cavity C of the injection molding mold 20; and a resin portion molding step of molding the resin portion 9 integrated with the insert members 10 by filling the injection molding resin into the cavity C. By performing the resin portion molding step, the insert members 10 are respectively arranged on surfaces of the weld portions W1 and W2 that are formed in the resin portion 9, and thereby, the continuous fibers contained in the insert members 10 are oriented in the direction crossing over the weld portions W1 and W2.

In addition, the resin gear 1 of the first embodiment includes the insert members 10 in which the layers of the base resin containing the continuous fibers are stacked by using the 3D printer and the resin portion 9 that is molded by the injection molding so as to be integrally formed with the insert members 10. The insert members 10 are arranged on the surfaces of the weld portions W1 and W2 that are formed in the resin portion 9, and thereby, the continuous fibers in the insert members 10 are oriented in the direction crossing over the weld portions W1 and W2.

In the first embodiment, because the insert members 10 are manufactured by using the 3D printer, it is possible to increase an accuracy of the shape of the insert members 10, and thus, it is possible to align the orientation of the continuous fibers within the insert members 10. Therefore, by arranging the insert members 10 in the cavity C, it is possible to arrange the insert members 10 at the reinforcing points of the resin gear 1 in a state in which the continuous fibers are oriented. Thus, it is possible to increase the reinforcing effect provided by the continuous fibers.

In addition, in the first embodiment, the air that has entrapped between the layers of the base resin containing the continuous fibers during the manufacture of the insert members by using the 3D printer can be squeezed out and removed by the resin pressure caused when the injection molding resin is filled into the cavity C. Therefore, it is possible to suppress the deterioration of the mechanical strength of the portions formed with the insert members 10.

Furthermore, in the first embodiment, it is possible to allow the air present between the insert members 10 and the injection molding resin flowing into the cavity C from the gates 26 to escape towards the side of air vent (not shown) by using spaces formed between the layers of the base resin containing the continuous fibers during the manufacture of the insert members using the 3D printer. Therefore, it is possible to make the injection molding resin to flow smoothly during the injection/filling, and therefore, it is possible to suppress the occurrence of molding failure.

In the first embodiment, by utilizing the resin pressure caused during the filling of the injection molding resin into the cavity C, the insert members 10 are brought into close contact with the mold surfaces which mold the meeting portions of the injection molding resin fronts. Thus, in the resin gear 1, the shapes of the mold surfaces of the injection molding mold molding the resin portion 9 is transferred to the insert members 10. In addition, the insert members 10, to which the shape of the injection molding mold 20 is transferred, are arranged on the surfaces of the weld portions formed in the resin portion 9. Therefore, it is possible to arrange the continuous fibers in a state in which they are oriented without breaking the continuous fibers such that the continuous fibers extend to cross over skin layers of the resin fronts when the resin fronts meet together at the weld portions. Therefore, it is possible to reinforce the surface portions of the weld portions with the continuous fibers and to suppress the deterioration of the strength of the resin gear 1 due to formation of the weld portions. Thus, it is possible to increase the strength of the resin gear 1.

In the manufacturing method of the first embodiment, the injection molding mold has the center pin 23 that is provided in the cavity C, and the insert members 10 include the inner insert sleeve 11 that is arranged at the inner side of the gates 26 and that is aligned so as to surround the center pin 23. In the injection molding step, the inner insert sleeve 11 is brought into close contact with the outer circumferential surface of the center pin 23 by the resin pressure caused by the injection molding resin flowing through the gates 26, and thereby, the first weld portions W1 extending from the center pin 23 towards the outer circumferential side are reinforced. In other words, in the first embodiment, the mold surface, with which the inner insert sleeve 11 is brought into close contact, is the outer circumferential surface of the center pin 23.

The resin gear 1 of the first embodiment includes the hole portion 5, and the insert members 10 include the inner insert sleeve 11 to which the shape of the hole portion 5 is transferred. As described above, in a case in which the resin gear 1 includes the hole portion 5 that is formed by the center pin 23, the inner insert sleeve 11 is brought into close contact with the outer circumferential surface of the center pin 23, and thereby, it is possible to reinforce the first weld portions W1 that are formed in the inner circumferential surface of the hole portion 5 with the continuous fibers contained in the inner insert sleeve 11. Therefore, it is possible to suppress the deterioration of the strength of the resin gear 1 due to the formation of the weld portions.

In addition, in the manufacturing method of the first embodiment, the injection molding mold 20 includes the tooth mold portion 25 that forms the tooth portion on the outer circumference portion of the resin gear 1, and the insert members 10 include the outer insert sleeve 12 that is arranged at the outer side of the gates 26 and that is aligned at the inner side of the tooth mold portion 25. In the injection molding step, the insert member 10 is brought into close contact with the inner circumferential surface of the tooth mold portion 25 by the resin pressure caused by the injection molding resin flowing through the gates 26, and thereby, the second weld portions W2 that are formed in the dedenda 8 in the tooth portion are reinforced. In other words, in the first embodiment, the mold surface, with which the outer insert sleeve 12 is brought into close contact, is the inner circumferential surface of the tooth mold portion 25.

The resin gear 1 of the first embodiment includes the tooth portion on the outer circumferential surface thereof, and the insert members 10 include the outer insert sleeve 12 to which the shape of the tooth portion is transferred. As described above, in a case in which the tooth portion is provided on the outer circumference portion of the resin gear 1, the outer insert sleeve 12 is brought into close contact with the inner circumferential surface of the tooth mold portion 25, and thereby, it is possible to reinforce the second weld portions W2 formed in the dedenda 8 with the continuous fibers. Therefore, it is possible to suppress the deterioration of the strength of the resin gear 1 due to the formation of the weld portions.

In the first embodiment, two members, the inner insert sleeve 11 and the outer insert sleeve 12 are used as the insert members 10, and the continuous fibers contained in the inner insert sleeve 11 and the continuous fibers contained in the outer insert sleeve 12 are of different types. Therefore, it is possible to manufacture the resin molded member having different properties at the inner circumferential surface and at the outer circumferential surface. In the first embodiment, it is possible to use suitable continuous fibers for each of the reinforcing points at the inner circumferential side and the reinforcing points at the outer circumferential side, and so, it is possible to increase the reinforcing effect. In addition, it is possible to avoid loss of the respective properties of the continuous fibers of different types due to the mixing of the continuous fibers of different types and interaction caused therebetween. For example, because the fibers, such as glass continuous fibers, basalt continuous fibers, and so forth, that cause a counterpart component to be worn out can be arranged in combination with the carbon continuous fibers and the aramid continuous fibers that increase a slidability without mixing these fibers together, it is possible to avoid the loss of the respective properties of the different types of continuous fibers due to the interaction.

For example, in the first embodiment, the inner insert sleeve 11 includes the carbon continuous fibers, and the outer insert sleeve 12 includes the aramid continuous fibers. Therefore, because a creep property and a flexural strength of the boss portion 2 that is formed with the hole portion 5 can be increased with the carbon continuous fibers, it is possible to reinforce the weld portions, and at the same time, it is possible to increase the slidability. In addition, it is possible to reinforce the weld portions in the outer circumference portion 4 that is formed with the tooth portion with the aramid continuous fibers, and at the same time, it is possible to increase an impact resistance in each of the teeth 7. In addition, it is possible to avoid the loss of the respective properties of the different types of continuous fibers due to the interaction between the carbon continuous fibers and the aramid continuous fibers.

For example, because the inner insert sleeve 11 contains the carbon continuous fibers, it is possible to manufacture the resin gear 1 in which the first weld portions W1, which are formed around the hole portion 5, each has a flexural modulus of from 35 GPa to 640 GPa, inclusive.

In addition, because the outer insert sleeve 12 contains the aramid continuous fibers, it is possible to manufacture the resin gear 1 in which the second weld portions W2, which are formed in the dedenda 8, each has a tensile modulus of from 54 GPa to 140 GPa, inclusive.

In the first embodiment, because the base resin and the injection molding resin are formed of the same resin, the integrity between the insert members 10 and the resin portion 9 that is formed by the injection molding is high. Therefore, it is possible to increase the strength of the resin gear 1.

(Modification of First Embodiment)

(1) Although the base resin and the injection molding resin are the same resin in the first embodiment, the base resin and the injection molding resin may not be the same resin. In this case, the base resin preferably has a lower melting point than the injection molding resin. If the melting point of the base resin is lower than that of the injection molding resin, the insert member 10 is easily thermally deformed by coming into contact with the resin being injected/filled. Therefore, the shape of the mold surface that molds the weld portion is easily transferred to the insert member 10.

In addition, in a case in which the base resin and the injection molding resin are not the same resin, the base resin preferably has a compatibility with the injection molding resin. If the base resin is compatible with the injection molding resin, it is possible to increase the integrity between the insert member 10 and the resin portion 9 that is formed by the injection molding. Therefore, it is possible to increase the strength of the resin gear 1.

(2) Although fibers and/or fillers are not added to the injection molding resin in the first embodiment, they may be added to the injection molding resin. For example, it is possible to add short fibers, such as the glass fibers, the carbon fibers, the potassium titanate fibers, the basalt fibers, and so forth, to one or both of the injection molding resin and the base resin. In the above-described embodiment, because the continuous fibers for reinforcing the weld portions are arranged in the cavity C in a state in which they are added to the insert member 10, even if fibers different from the continuous fibers are added to the injection molding resin, it is possible to avoid mutual interference with the continuous fibers. Therefore, it is possible to utilize both of the property of the continuous fibers added to the insert member 10 and the property of the short fibers added to the injection molding resin.

(3) It suffices that the building method of the insert member 10 using the 3D printer is the method capable of building the three-dimensional shape by stacking layers of the base resin containing the continuous fibers in a state in which the continuous fibers are oriented. For example, it may be possible to employ a method using a UD sheet as the molding material. The UD sheet is a sheet-shaped unidirectional fibrous reinforcement material that is formed by impregnating continuous fibers oriented in one direction into the thermoplastic resin or a thermosetting resin. Because the UD sheet contains oriented continuous fibers in a great amount, the oriented continuous fibers are densely arranged on the surface of the resin gear 1. Therefore, the reinforcing effect achieved by the continuous fibers is high.

For example, in the 3D printer of a fused deposition modeling type, the UD sheet having linear or strip shape and the base resin are supplied to a supply portion that injects the molding material. The UD sheet having linear or strip shape contains fiber bundles of the oriented continuous fibers. The UD sheet is extruded from the injection unit together with the thermally melted base resin and stacked on the support table. For example, in a case in which the barrel-shaped insert member 10 is to be manufactured, the insert member 10 is molded by helically stacking the UD sheet having linear or strip shape together with the base resin. By doing so, it is possible to build the insert member 10 in which the continuous fibers are oriented in the circumferential direction.

Second Embodiment (Configuration of Suspension Device)

Figure 8:
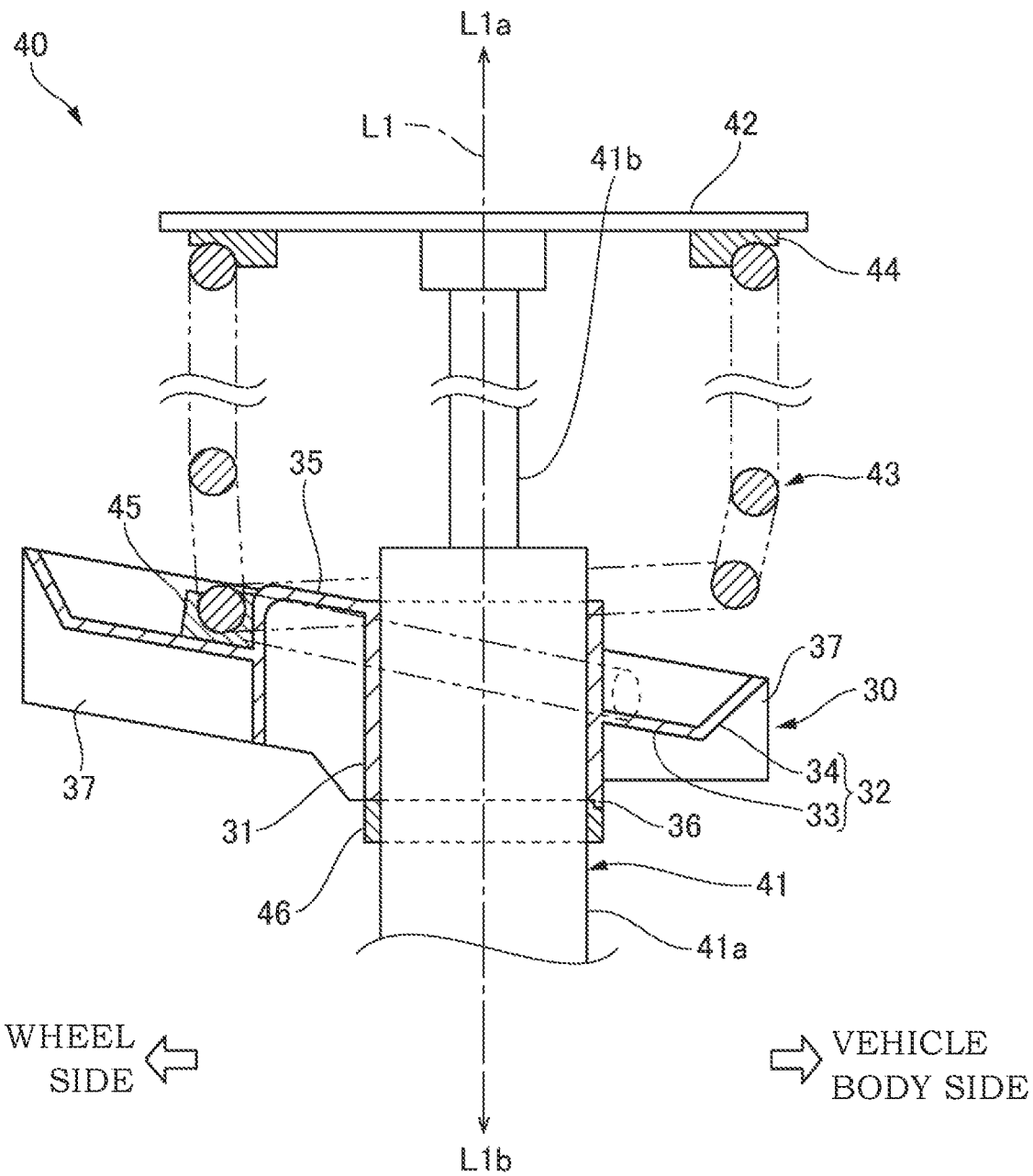
FIG. 8 is a partial sectional view of a suspension device including a spring guide according to an embodiment of the present invention.
Figure 9:
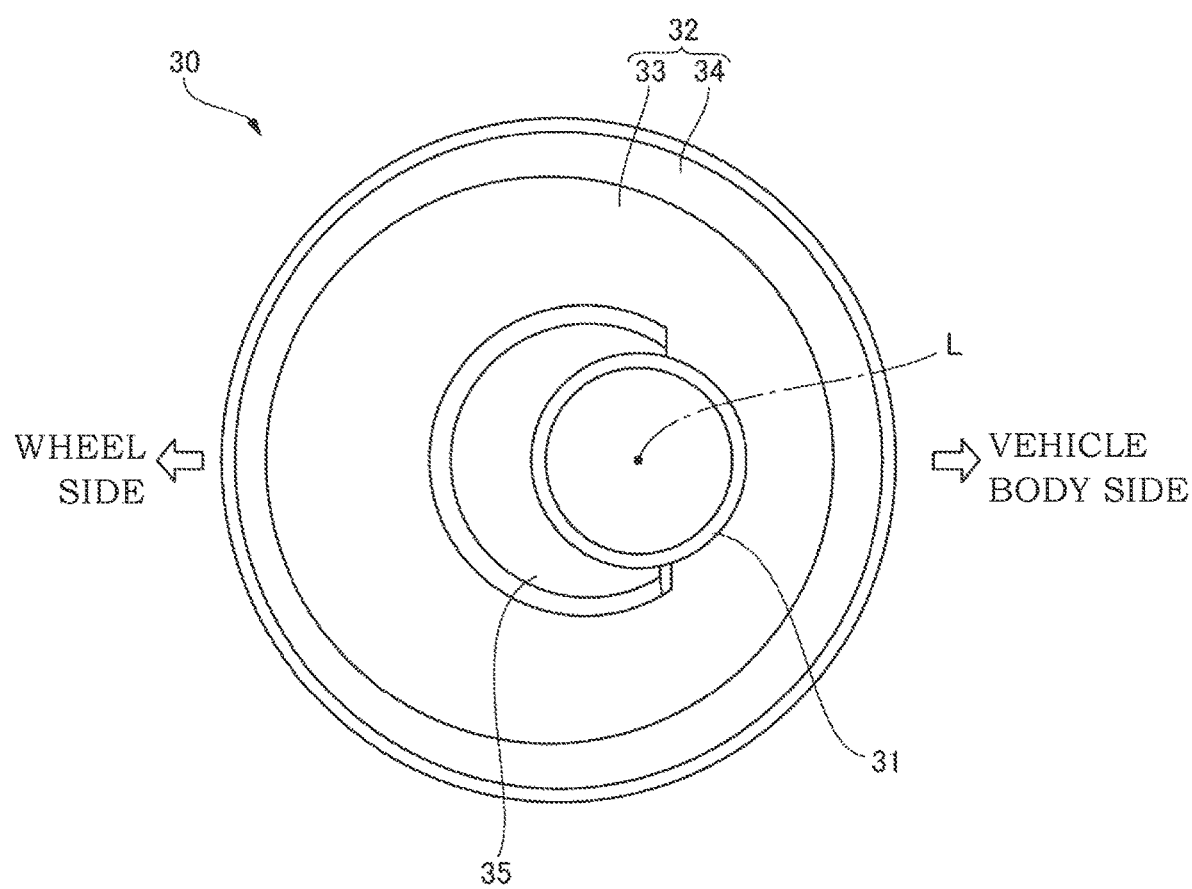
FIG. 9 is a plan view of the spring guide.

FIG. 8 is a partial sectional view of the suspension device 40 including the spring guide 30 to which the present invention is applied. FIG. 9 is a plan view of the spring guide 30 shown in FIG. 8. The configuration of the suspension device 40 and the function thereof will be described first with reference to FIG. 8. The suspension device 40 is a device that is installed between the vehicle body and a wheel of a vehicle to align the wheel and as well as to absorb impacts and vibrations received from a road surface during a travelling of the vehicle.

As shown in FIG. 8, the suspension device 40 includes: a shock absorber 41 that has a cylinder 41a and a piston rod 41b; an upper mount 42 that is attached to a tip end of the piston rod 41b; the spring guide 30 that is attached to an outer circumference of the cylinder 41a; and a coil spring 43 that is arranged between the spring guide 30 and the upper mount 42. The piston rod 41b is protected by a tubular bump cap (not shown). In the second embodiment, L1 is assigned to the center axis of the cylinder 41a, and the direction along the center axis L1 is referred to as the axial direction. The upper mount 42 is arranged on the first side L1a of the shock absorber 41 in the axial direction. The spring guide 30 supports the coil spring 43 from the second side L1b in the axial direction.

The upper mount 42 is connected to the vehicle body, and the cylinder 41a is connected to a hub carrier that holds the wheel via a bracket (not shown). The shock absorber 41 generates the damping force when the piston rod 41b is moved in the axial direction of the cylinder 41a. In the suspension device 40, the vibration of the vehicle body is damped by the damping force generated by the shock absorber 41. The coil spring 43 is compressed and arranged between the spring guide 30 and the upper mount 42 and biases the shock absorber 41 in the expanding direction. An arc-shaped rubber seat 44 is arranged between the coil spring 43 and the upper mount 42. In addition, an arc-shaped rubber seat 45 is arranged between the coil spring 43 and the spring guide 30.

(Spring Guide)

FIG. 9 is a plan view of the spring guide 30 shown in FIG. 8. As shown in FIGS. 8 and 9, the spring guide 30 includes a barrel portion 31 that is fixed to the cylinder 41a and a dish-shaped spring catcher portion 32 that supports the coil spring 43. The spring catcher portion 32 includes a ring-shaped placing portion 33 that extends outwards from the barrel portion 31 and an annular outer edge portion 34 that is erected towards the first side L1a from an outer circumference edge of the placing portion 33. The vehicle body side of the spring catcher portion 32 is inclined in the direction towards the second side L1b with respect to the center axis L1, and the wheel side of the spring catcher portion 32 is inclined in the direction towards the first side L1a with respect to the center axis L1. The barrel portion 31 is arranged at a position decentered towards the vehicle body side relative to the center of the spring catcher portion 32. Note that, the spring catcher portion 32 may have a shape in which the placing portion 33 is not inclined relative to the direction perpendicular to the center axis L. In addition, the barrel portion 31 may be arranged at the center of the spring catcher portion 32. On an inner circumference portion of the spring catcher portion 32, a projecting portion 35 that projects out towards the first side L1a side of the placing portion 33 and that surrounds the wheel side of the barrel portion 31 in an arc shape is provided. The rubber seat 45 that is interposed between the coil spring 43 and the spring guide 30 is arranged around the projecting portion 35.

The spring guide 30 is fixed to the shock absorber 41 by press-fitting the cylinder 41a into the inside of the barrel portion 31. The spring guide 30 is supported from the second side L1b by a support ring 46 that is fixed to an outer circumferential surface of the cylinder 41a. The barrel portion 31 includes rotation restriction ribs 36 that restrict rotation of the spring guide 30 relative to the cylinder 41a. The rotation restriction ribs 36 are projected from an end surface of the barrel portion 31 on the second side L1b. The support ring 46 includes contacting portions that respectively come into contact with the rotation restriction ribs 36 of the spring guide 30 in the circumferential direction. In addition, the spring guide 30 includes reinforcing ribs 37 that are formed on the surface of the spring catcher portion 32 on the second side L1b.

For the spring guide for the suspension device, in order to reduce the weight, a material substitution has been performed from metal to resin. However, it is difficult to control the orientation of the fibers by only adding the reinforcing fibers to the injection molding resin, and there is an issue in that it is not possible to achieve a reinforcing effect required against an impact exerted in an event of breakage of the coil spring 43 and a fatigue breakdown caused by a load from the coil spring 43. In addition, because the spring guide 30 cannot be fixed to the shock absorber 41 by welding, the rotation restriction ribs 36 are required, and so, it is required to ensure a sufficient strength against a load received by the rotation restriction ribs 36. Furthermore, for the assembly of the spring guide 30 to the shock absorber 41, it is preferred that the spring guide 30 be fixed by press-fitting in order to prevent noise during the travelling of the vehicle and to improve a steering response, and so, it is required to take measures against cracking caused during the press-fitting and against decrease in press-fitting force over time. With the spring guide 30 of the second embodiment, in order to address these issues, reinforcement is achieved by using insert members 50 that are manufactured by using the 3D printer.

(Manufacturing Method of Spring Guide)

Figure 10:
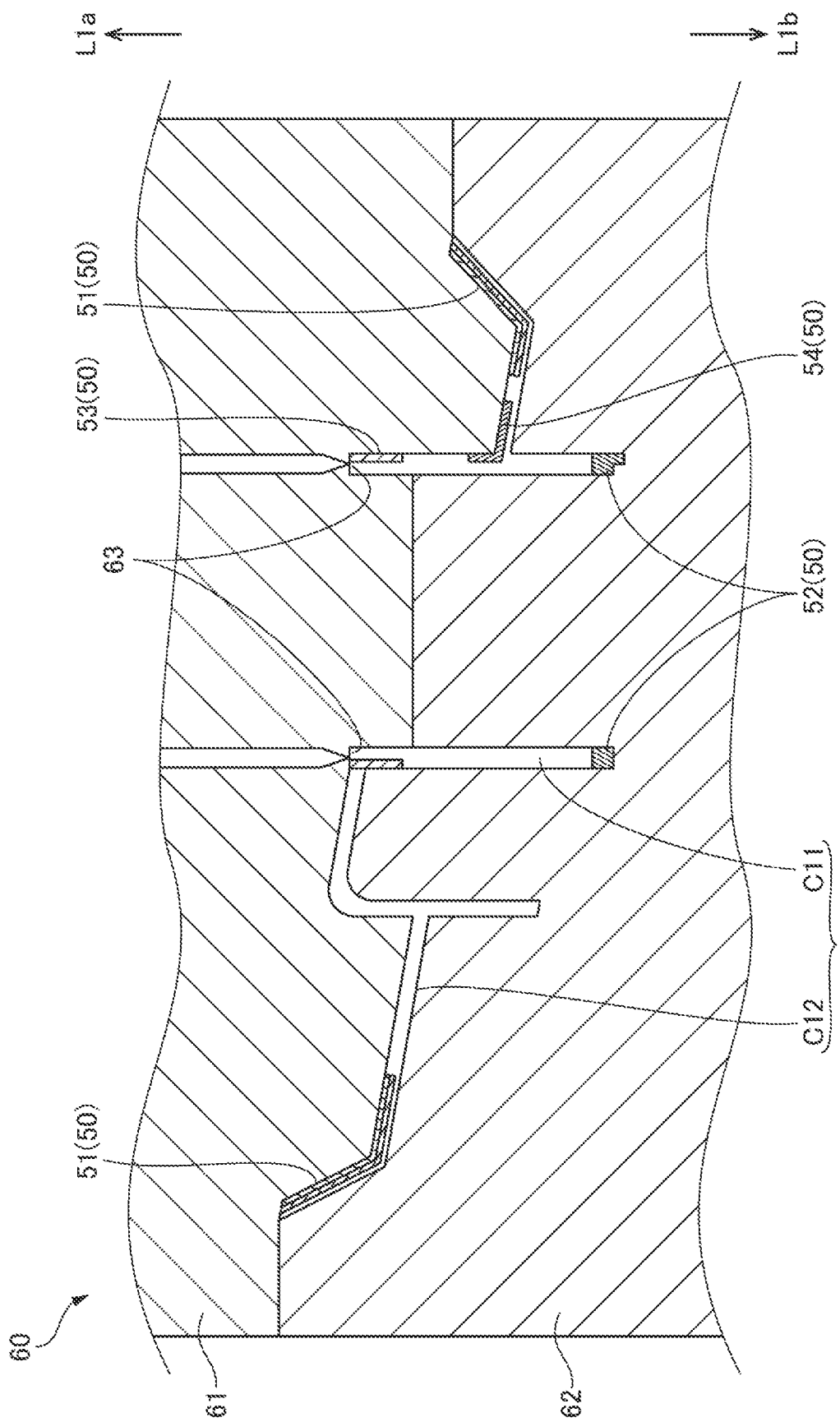
FIG. 10 is a sectional view of the injection molding mold that is used for the manufacture of the spring guide.

FIG. 10 is a sectional view of an injection molding mold 60 that is used for manufacture of the spring guide 30 shown in FIG. 8. The spring guide 30 is manufactured by the insert molding in which the insert members 50 made of resin are arranged in the inside of the injection molding mold 60 and the resin is filled into the injection molding mold 60. Therefore, the spring guide 30 includes the insert members 50 and a resin portion 39 that is molded integrally with the insert members 50 (see FIGS. 11 and 12).

As shown in FIG. 10, the insert members 50 are arranged in a cavity C10 of the injection molding mold 60 and are attached to the mold surface. In this state, the injection molding resin is filled into the cavity C10 from gates 63 and cured. The insert members 50 are arranged on the surfaces of the finished spring guide 30. In addition, the insert members 50 are brought into close contact with the mold surface of the injection molding mold 60 by the heat and pressure applied during the filling of the injection molding resin. Therefore, the shape of the mold surface is transferred to the insert members 50.

The injection molding resin is the thermoplastic resin. The spring guide 30 is manufactured by using the polyamide resin as the injection molding resin. Other thermoplastic resins may also be used as the injection molding resin. In the second embodiment, the injection molding is performed by using the injection molding resin that is formed by adding the short fibers to the polyamide resin. As the short fibers, the short fibers such as the aramid fibers, the carbon fibers, the potassium titanate fibers, the glass fibers, the basalt fibers, and so forth can be used. For example, the short fibers may be of the same material as that of the continuous fibers contained in the insert members 50, which will be described later, or the short fibers may also be of the different material from that of the continuous fibers.

As shown in FIG. 10, the injection molding mold 60 includes a first mold member 61 that is provided so as to be stationary and a second mold member 62 that is provided so as to be movable, and the cavity C10 is formed by causing the first mold member 61 and the second mold member 62 to contact with each other. Note that, each of the first mold member 61 and the second mold member 62 may also be formed of a plurality of mold members. The cavity C10 of the injection molding mold 60 includes a first cavity portion C11 that molds the barrel portion 31 and a second cavity portion C12 that molds the spring catcher portion 32.

The injection molding mold 60 includes the gates 63 for filling the injection molding resin (the resin material) into the cavity C10. The gates 63 are provided on end portions of the first cavity portion C11 on the first side L1a, and the injection molding resin supplied from the gates 63 are filled into the second cavity portion C12 by flowing through the first cavity portion C11. The gates 63 are arranged at predetermined intervals in the circumferential direction. Therefore, because the injection molding resin is supplied radially from the gates 63 at multiple locations, in the barrel portion 31 and the spring catcher portion 32, the weld portions (not shown) are formed at middle angular positions between adjacent gates 63 in the circumferential direction.

(Insert Members)

Figure 11:
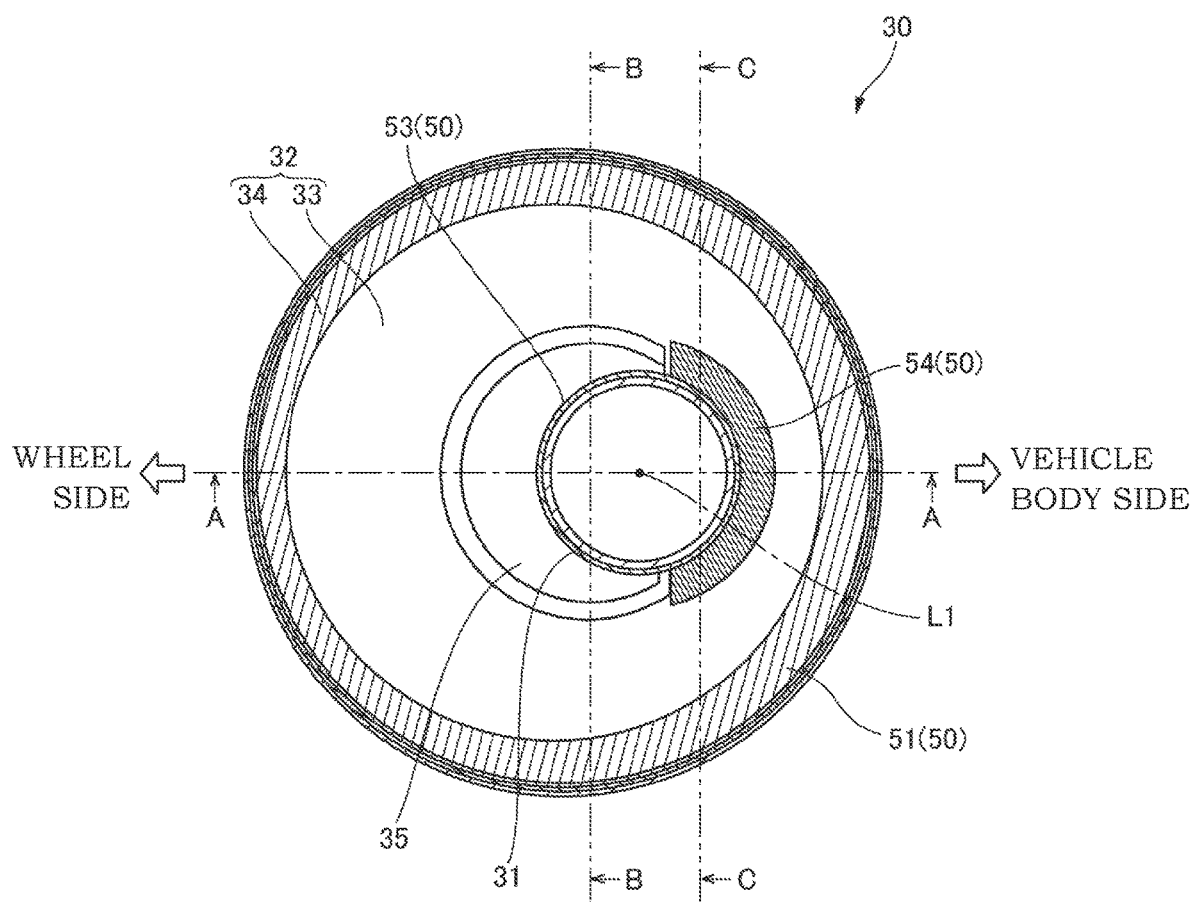
FIG. 11 is a plan view showing arrangement of insert members in the spring guide.
Figure 12A:
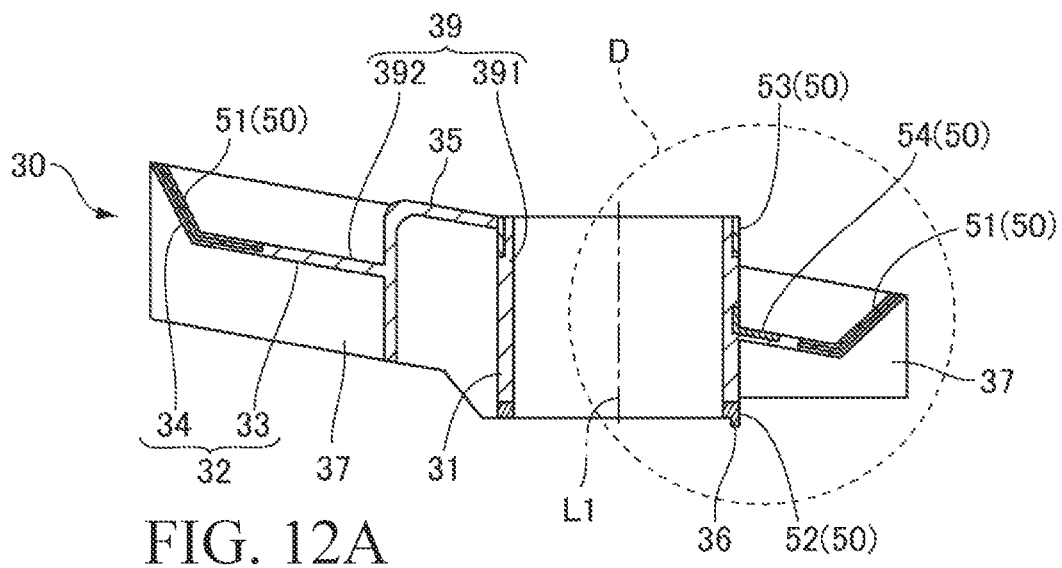
FIG. 12A is a sectional view showing the arrangement of the insert members in the spring guide, and is a sectional view taken along line A-A in FIG. 11.
Figure 12B:
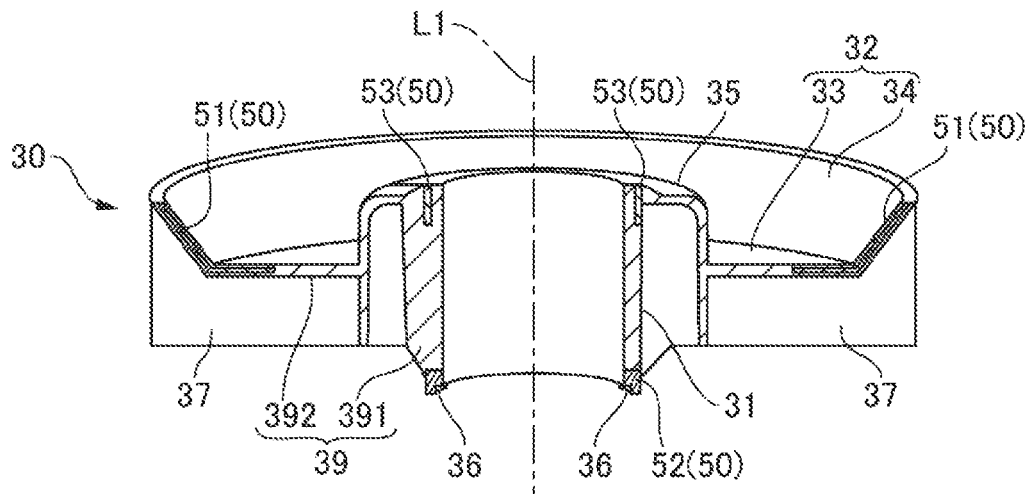
FIG. 12B is a sectional view showing the arrangement of the insert members in the spring guide, and is a sectional view taken along line B-B in FIG. 11.
Figure 12C:
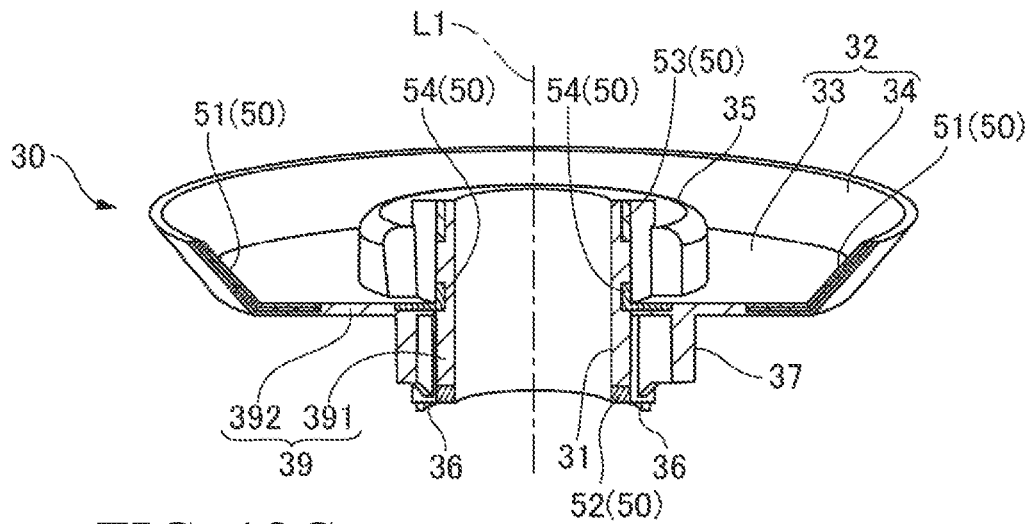
FIG. 12C is a sectional view showing the arrangement of the insert members in the spring guide, and is a sectional view taken along line C-C in FIG. 11.

FIG. 11 is a plan view showing arrangement of the insert members 50 on the spring guide 30. FIG. 12 is a sectional view showing the arrangement of the insert members 50 on the spring guide 30. FIG. 12A is a sectional view taken along line A-A in FIG. 11. FIG. 12B is a sectional view taken along line B-B in FIG. 11. FIG. 12C is a sectional view taken along line C-C in FIG. 11.

As shown in FIGS. 10 to 12, the spring guide 30 is reinforced with the insert members 50 at four locations. The insert members 50 include a first insert member 51, a second insert member 52, a third insert member 53, and a fourth insert member 54. The first insert member 51 is arranged on an outer circumference portion of the spring catcher portion 32. The second insert member 52 is arranged on an end portion of the barrel portion 31 on the second side L1b. The third insert member 53 is arranged on an end portion of the barrel portion 31 on the first side L1a. The fourth insert member 54 is arranged on the connecting portion between the barrel portion 31 and the spring catcher portion 32 so as to form an arc shape.

In the spring guide 30, the resin portion 39 formed of the injection molding resin includes a first resin portion 391 that forms the barrel portion 31 and a second resin portion 392 that forms the spring catcher portion 32. The first insert member 51 is integrated with the second resin portion 392. The second insert member 52 and the third insert member 53 are integrated with the first resin portion 391. The fourth insert member 54 is integrated with the first resin portion 391 and the second resin portion 392.

The insert members 50 are each manufactured by using the 3D printer. Similarly to the first embodiment, the insert member 50 is manufactured by stacking the layers of the base resin containing the continuous fibers. The base resin is the thermoplastic resin. The insert member 50 is manufactured by using the polyamide resin as the base resin. Note that, other thermoplastic resins may also be used as the base resin. As the continuous fibers, for example, the continuous fibers such as the aramid fibers, the carbon fibers, the potassium titanate fibers, the glass fibers, the basalt fibers, and so forth may be used.

In the insert member 50, an orientation of the continuous fibers is uniform in one direction for all layers of the molding material, or an orientation of the continuous fibers is uniform for each layer of the molding material. If the orientation of the continuous fibers is uniform for each layer, the continuous fibers may be oriented in different directions for each layer. For example, by using the 3D printer, it is possible to manufacture the insert member 50 having a configuration in which a first layer and a second layer stacked on the first layer are provided, and an orientation of the continuous fibers of the first layer and an orientation of the continuous fibers of the second layer are different each other. By using the insert member 50 including the layers of the continuous fibers with different orientations, the reinforcing effect can be achieved against multidirectional stress. Note that, also in the insert members 10 of the first embodiment, it is possible to provide the first layer and the second layer with different continuous fiber orientations.

(Reinforcement of Spring Catcher Portion with First Insert Member)

Figure 13:
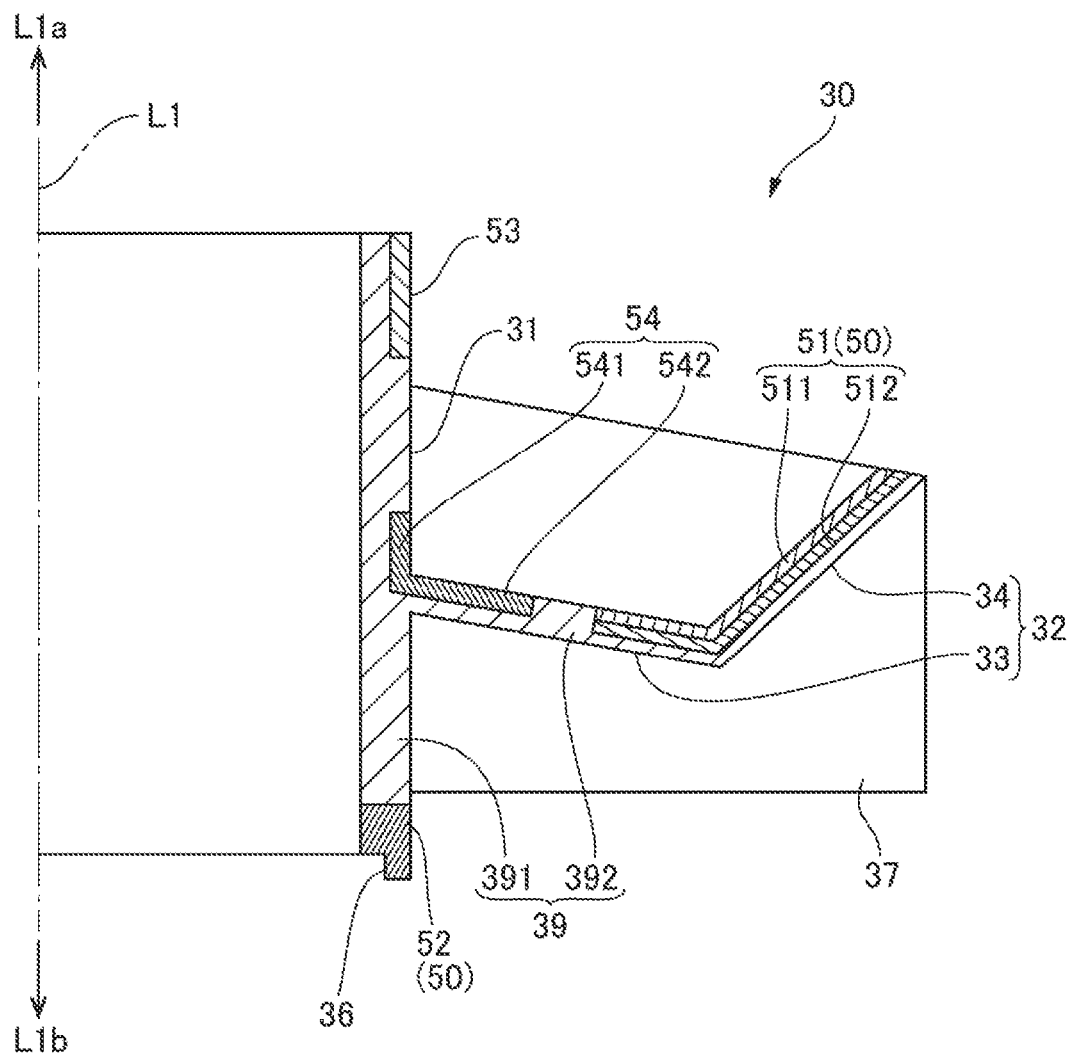
FIG. 13 is a partial enlarged sectional view of a part at which the insert members are arranged.

FIG. 13 is partial enlarged sectional view of a part at which the insert members 50 are arranged and is an enlarged view of a region D in FIG. 12A. As shown in FIG. 11, the first insert member 51 is an annular member that is arranged on the outer circumference portion of the spring catcher portion 32 over the entire circumference. As shown in FIG. 13, the first insert member 51 is arranged on the outer circumference portion of the placing portion 33 of the spring catcher portion 32 and the outer edge portion 34 so as to extend to a tip end portion of the outer edge portion 34. The first insert member 51 is arranged on the surface of the spring catcher portion 32 on the first side L1a. In other words, the first insert member 51 is arranged at the location where the coil spring 43 is expected to fall when the coil spring 43 is broken, and the first insert member 51 is arranged on the surface of on the seat surface side that receives the falling impact from the coil spring 43. The second side L1b of the first insert member 51 is covered with the second resin portion 392.

The first insert member 51 is a resin member having a bilayer structure and includes a first reinforcing portion 511 and a second reinforcing portion 512 that is overlapped on the second side L1b of the first reinforcing portion 511. The first insert member 51 is manufactured by using the 3D printer such that the first reinforcing portion 511 and the second reinforcing portion 512 are laminated, and thereby, the first reinforcing portion 511 and the second reinforcing portion 512 are integrated with each other. The first reinforcing portion 511 and the second reinforcing portion 512 respectively contain different continuous fibers. The first reinforcing portion 511 contains the aramid continuous fibers, and the second reinforcing portion 512 contains the carbon continuous fibers or the glass continuous fibers.

Each of the first reinforcing portion 511 and the second reinforcing portion 512 includes a plurality of layers of the base resin containing the continuous fibers, and an orientation of the continuous fibers is uniform for each layer. Each of the first reinforcing portion 511 and the second reinforcing portion 512 includes the layers in which the continuous fibers are oriented in the circumferential direction. In addition, each of the first reinforcing portion 511 and the second reinforcing portion 512 may include the layers in which the continuous fibers are oriented in the direction other than the circumferential direction. In addition, each of the first reinforcing portion 511 and the second reinforcing portion 512 may include a first layer in which the continuous fibers are oriented in the circumferential direction and a second layer in which the continuous fibers are oriented in the direction other than the circumferential direction.

The first insert member 51 is arranged such that the first reinforcing portion 511 containing the aramid continuous fibers forms the surface of the portion where the coil spring 43 is expected to fall. Therefore, in the spring catcher portion 32, the surface receiving the falling impact of the coil spring 43 is reinforced with the aramid continuous fibers. With such a configuration, rupture of the spring catcher portion 32 due to the falling impact of the coil spring 43 is suppressed.

In addition, the first insert member 51 is arranged such that the second reinforcing portion 512 whose rigidity is increased by containing the carbon continuous fibers or the glass continuous fibers is located on the back surface side of the first reinforcing portion 511. Therefore, because the rigidity of the portion where the coil spring 43 is expected to fall is increased with the second reinforcing portion 512, the deformation of the spring catcher portion 32 due to the impact is suppressed. Thus, propagation of the rupture and crack in the spring catcher portion 32 is suppressed.

(Reinforcement of Rotation Restriction Ribs with Second Insert Member)

Figure 14:
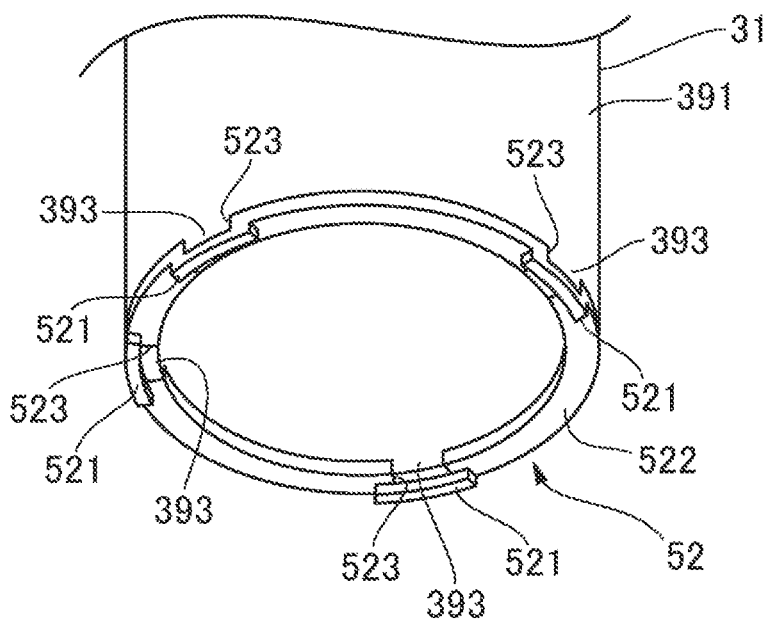
FIG. 14 is a perspective view of rotation restriction ribs.

FIG. 14 is a perspective view of the rotation restriction ribs 36 and is a perspective view of the end portion of the barrel portion 31 on the second side L1b viewed from the second side L1b. As shown in FIG. 14, the second insert member 52 is arranged on the end portion of the barrel portion 31 on the second side L1b and is integrated with the first resin portion 391 formed of the injection molding resin. The rotation restriction ribs 36 are configured of projected portions 393 that protrude from the end surface of the first resin portion 391 on the second side L1b and reinforcing portions 521 that cover both sides in the circumferential direction and the second side L1b of the projected portions 393.

The second insert member 52 includes: an annular ring portion 522 that is fixed to the end surface of the first resin portion 391 on the second side L1b; the reinforcing portions 521 that project from the annular ring portion 522 towards the second side L1b; and notch portions 523 that are formed by notching the portions of the reinforcing portions 521 on the first side L1a towards the second side L1b. When the barrel portion 31 is molded, the injection molding resin is filled into the first cavity portion C11 from the first side L1a of the second insert member 52 that is aligned at an end portion of the first cavity portion C11 on the second side L1b and the injection molding resin is cured. By doing so, the injection molding resin is filled into the notch portions 523 to mold the projected portions 393, and thereby, the reinforcing portions 521 are integrated with the projected portions 393.

The second insert member 52 contains the carbon continuous fibers or the glass continuous fibers. For the second insert member 52, the annular ring portion 522 is manufactured such that the continuous fibers are oriented in the circumferential direction. In addition, the continuous fibers are arranged so as to cross over the boundary between the reinforcing portions 521 and the annular ring portion 522. Therefore, the end portions of the barrel portion 31 on the second side L1b is reinforced over the entire circumference with the carbon continuous fibers or the glass continuous fibers. In addition, the boundary between the rotation restriction ribs 36 and the barrel portion 31 is reinforced with the carbon continuous fibers or the glass continuous fibers. With such a configuration, breakage due to the shearing stress, which is generated when the load is exerted to the rotation restriction ribs 36 in the rotation direction, is suppressed.

(Reinforcement of Barrel Portion with Third Insert Member)

As shown in FIGS. 11 to 13, the third insert member 53 has a barrel shape and is arranged on the end portion of the barrel portion 31 on the first side L1a. Therefore, in the end portion of the barrel portion 31 on the first side L1a, the outer circumference portion thereof is formed of the third insert member 53, and the inner circumference portion thereof is formed of the first resin portion 391. The gates 63 of the injection molding mold 60 are provided on an end portion of the first cavity portion C1 on the first side L1a for molding the barrel portion 31. Therefore, the third insert member 53 is arranged at the position for reinforcing the end portion of the barrel portion 31 on the gates 63 side.

The third insert member 53 contains the carbon continuous fibers or the glass continuous fibers. The third insert member 53 is manufactured such that the continuous fibers are oriented in the circumferential direction. Therefore, the continuous fibers are arranged over the entire circumference of the barrel portion 31 and are arranged so as to cross over the weld portions that are formed at middle angular positions between adjacent gates 63 in the circumferential direction. With such a configuration, it is possible to suppress cracking of the barrel portion 31 caused by the stress generated when the cylinder 41a of the shock absorber 41 is press-fitted into the barrel portion 31. In addition, only by arranging the third insert member 53 on the end portion of the barrel portion 31 on the gates 63 side, it is possible to arrange the continuous fibers at positions where the reinforcing effect achieved against the weld portions is the highest. Therefore, it is possible to reinforce the weld portions efficiently.

In addition, the third insert member 53 forms the outer circumference portion of the barrel portion 31, and the inner circumference portion thereof coming into contact with the cylinder 41a is formed of the injection molding resin. Therefore, the reinforcement of the third insert member 53 does not make the press-fitting of the cylinder 41a into the barrel portion 31 more difficult. Furthermore, after the cylinder 41a is press-fitted, because the creeping and stress relaxation of the barrel portion 31 is suppressed by the third insert member 53, lowering of a binding force of the barrel portion 31 against the cylinder 41a over time is suppressed.

(Reinforcement of Connecting Portion Between Barrel Portion and Spring Catcher Portion with Fourth Insert Member)

As shown in FIGS. 11 to 13, the fourth insert member 54 is arranged at the connecting portion between the barrel portion 31 and the spring catcher portion 32. As shown in FIG. 11, the fourth insert member 54 is arranged at the vehicle body side area of the barrel portion 31 so as to form the arc shape and is arranged within an angle range in which the projecting portion is not provided. As shown in FIG. 13, the fourth insert member 54 includes a first portion 541 that is arranged on the barrel portion 31 and a second portion 542 that is arranged on the placing portion 33 of the spring catcher portion 32. The first portion 541 extends in the axial direction and forms a surface layer portion of the barrel portion 31 on the outer circumferential side. The second portion 542 extends from an end portion of the first portion 541 on the second side L1b towards the outer circumferential side and forms a surface portion of the placing portion 33 on the first side L1a. Therefore, the second portion 542 is arranged on the surface of the placing portion 33 on the seat surface side for supporting the coil spring 43.

The fourth insert member 54 contains the carbon continuous fibers or the glass continuous fibers. Therefore, because it is possible to increase the rigidity of the surface layer portion of the connecting portion between the barrel portion 31 and the spring catcher portion 32, the flexure caused by the load exerted from the coil spring 43 can be suppressed, and it is possible to improve fatigue-resistant. In addition, flows of the resin tends to become complex in the connecting portion between the barrel portion 31 and the spring catcher portion 32, and the weld portion tend to be formed. Therefore, by arranging the continuous fibers at this location, it is possible to reinforce the weld portion effectively.

The fourth insert member 54 contains the continuous fibers that are oriented in the direction crossing over the boundary between the first portion 541 and the second portion 542. In addition, the fourth insert member 54 may also contain the continuous fibers that are oriented in the circumferential direction. In this case, when the fourth insert member 54 is manufactured, it may stack a layer in which the continuous fibers are oriented in the direction crossing over the first portion 541 and the second portion 542 and a layer in which the continuous fibers are oriented in the circumferential direction.

(Air Venting Method Using Spaces in Insert Member at Time of Injection/Filling)

Figure 15:
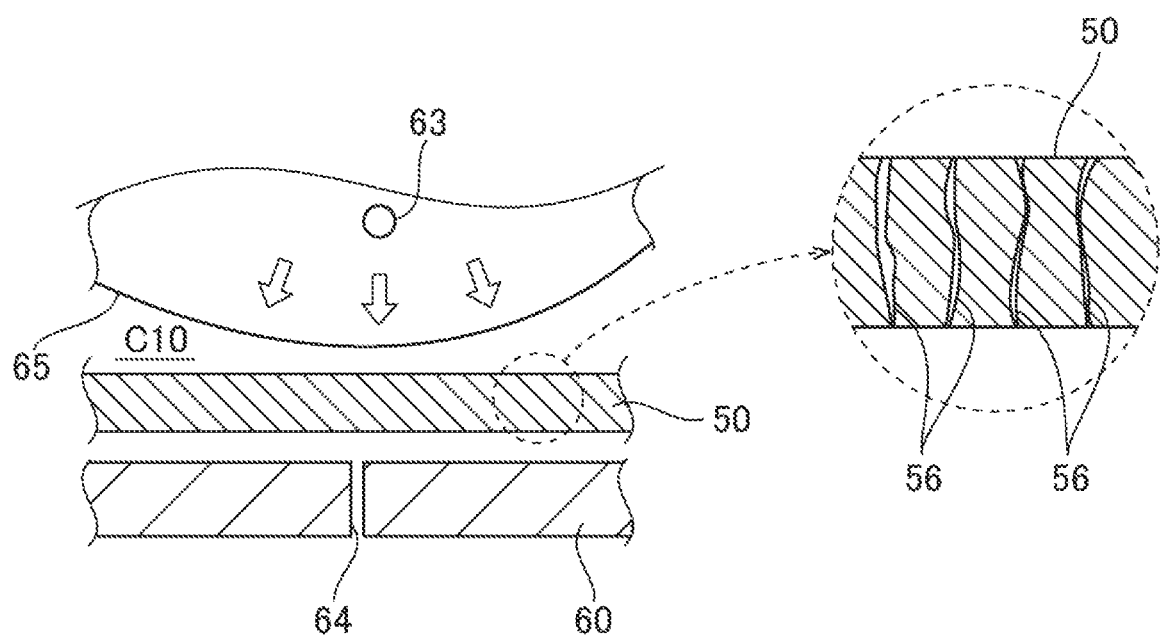
FIG. 15 is an explanatory diagram schematically showing a method for venting air using spaces in the insert members.

FIG. 15 is an explanatory diagram schematically showing a method of venting air using spaces in the insert members 50. The injection molding mold 60 includes air vents 64 for removing the air inside the mold to the outside when the injection molding resin is being filled. FIG. 15 is a diagram schematically showing the air vent 64, the insert member 50, and an injection molding resin 65 entering from the gate 63. When the molded item is formed by stacking the layers of the base resin containing the continuous fibers by using the 3D printer, small spaces are formed between the layers of the molding material. Thus, the insert member 50 includes, in the inside thereof, spaces 56.

As shown in FIG. 15, in a case in which the insert member 50 is arranged along the mold surface of the injection molding mold 60 and in which the injection molding resin 65 is filled from the gate 63 that is arranged on the opposite side from the mold surface, it is possible to allow the air present between the insert member 50 and the injection molding resin 65 to escape towards the mold surface side through the spaces 56 in the insert member 50. Therefore, it is possible to vent the air through the air vent 64, and it is possible to fill the injection molding resin 65 to the location where the insert member 50 is arranged smoothly. Thus, because the flow of the injection molding resin 65 is made smooth during the injection/filling, it is possible to suppress the occurrence of the molding failure.

Because the insert member 50 is subjected to the resin pressure during the injection/filling, the spaces 56 in the insert member 50 are crushed by the resin pressure, and so, the air that has entrapped between the layers of the base resin containing the continuous fibers is vented. Therefore, with the spring guide 30, the deterioration of the mechanical strength of the portion formed with the insert member 50 is suppressed.

(Main Functions and Advantages of Second Embodiment)

The manufacturing method of the spring guide 30 of the second embodiment includes: the insert member molding step of building the insert members 50 by stacking the layers of the base resin containing the continuous fibers by using the 3D printer; the aligning step of aligning the insert members 50 in the cavity C10 of the injection molding mold; and the resin portion molding step of molding the resin portion 39 that is integrated with the insert members 50 by filling the cavity C10 with the injection molding resin. By performing the resin portion molding step, the insert members 50 are respectively arranged on the surfaces of the weld portions that are formed in the resin portion 39, and thereby, the continuous fibers contained in the insert members 50 are oriented in the direction crossing over the weld portions.

In addition, the spring guide 30 of the second embodiment includes: the insert members 50 in which the layers of the base resin containing the continuous fibers are stacked by using the 3D printer; and the resin portion 39 that is molded by the injection molding so as to be integrated with the insert members 50. The insert members 50 are arranged on the surfaces of the weld portions that are formed in the resin portion 39, and the continuous fibers contained in the insert members 50 are oriented in the direction crossing over the weld portions.

In the second embodiment, because the insert members 50 are manufactured by using the 3D printer, it is possible to increase the accuracy of the shape of the insert members 50, and thus, it is possible to align the orientation of the continuous fibers within the insert members 50. Therefore, by arranging the insert members 50 in the cavity C10, it is possible to arrange the insert members 50 with a high accuracy at the reinforcing points of the spring guide 30 in a state in which the continuous fibers are oriented. Thus, it is possible to increase the reinforcing effect provided by the continuous fibers.

In addition, in the second embodiment, by utilizing the resin pressure generated during the filling of the cavity C10 with the injection molding resin, it is possible to squeeze out and remove the air that has entrapped between the layers of the base resin containing the continuous fibers during the manufacture of the insert members 50 using the 3D printer. Therefore, it is possible to suppress the deterioration of the mechanical strength in the portions formed of the insert members 50.

Furthermore, in the second embodiment, by utilizing the spaces 56 formed between the layers of the base resin containing the continuous fibers during the manufacture of the insert members 50 using the 3D printer, it is possible to allow the air between the insert members 50 and the injection molding resin entering the cavity C10 from the gates 63 to escape towards the air vents 64 side. Therefore, it is possible to make the injection molding resin to flow smoothly during the injection/filling, and thus, it is possible to suppress the occurrence of the molding failure.

In the second embodiment, the shape of the mold surface of the injection molding mold 60 is transferred to the insert members 50 by the resin pressure generated during the filling of the injection molding resin into the cavity C10. Thus, in the spring guide 30, the insert members 50 are arranged on the surfaces of the resin portion 39, and the shape of the mold surface of the injection molding mold 60 that molds the resin portion 39 is transferred to the insert members 50.

As described above, by achieving the reinforcement by respectively covering the surfaces of the spring guide 30 with the insert members 50, it is possible to increase the strength of the spring guide 30. Especially, it is possible to suppress the rupture of the surface of the spring guide 30 caused by the impact. In addition, because the shape of the mold surface is transferred to the insert members 50 by the resin pressure, it is possible to arrange the insert members 50 on the surfaces of the molded item without causing the breakdown of the continuous fibers and in a state in which the continuous fibers are oriented. Therefore, it is possible to increase the reinforcing effect achieved by the continuous fibers.

For the spring guide 30, when the resin portion 39 is manufactured by the injection molding, the resin is injected and filled via the gates 63 that are arranged at the multiple locations along the circumferential direction. Therefore, the weld portion is formed at the meeting portion of the fronts of the resin for the injection/filling. In addition, because the spring guide 30 has the shape in which the spring catcher portion 32 is connected to the barrel portion 31, the flow of the resin becomes complex, and the molding failure such as the weld portion is caused. The insert member 50 is arranged on the surface of the weld portion that is formed in the resin portion 39, and the continuous fibers are oriented in the direction crossing over the weld portion. Therefore, because it is possible to reinforce the surface of the weld portion with the continuous fibers, it is possible to suppress the deterioration of the strength of the spring guide 30 due to the formation of the weld portion.

In the spring guide 30, the base resin that is the molding material of the insert member 50 is the polyamide resin, and the injection molding resin that is the molding material of the resin portion 39 is also the polyamide resin. Therefore, because the insert member 50 is manufactured by using, as the base resin, the same resin as the resin portion 39, the integrity between the insert member 50 and the resin portion 39 is high.

In the spring guide 30, the short fibers are contained in the resin portion 39. When the spring guide 30 is manufactured, because the continuous fibers are not contained in the injection molding resin and are arranged in the cavity C10 as the form of the insert member 50, even if the short fibers are added to the injection molding resin, it is possible to avoid the mutual interference between the short fibers and the continuous fibers. Therefore, it is possible to utilize both of the property of the continuous fibers that are added to the insert member 50 and the property of the short fibers that are added to the injection molding resin. Note that, in the second embodiment, it may be possible to employ a configuration in which the short fibers are not added to the injection molding resin.

The spring guide 30 includes the plurality of insert members 50, and the first insert member 51 and the second insert member 52 respectively contain different continuous fibers. In other words, the first insert member 51 contains the aramid continuous fibers, and the second insert member 52 contains the carbon continuous fibers or the glass continuous fibers. The first insert member 51 and the second insert member 52 are respectively arranged at different reinforcing points. Therefore, because the types of the continuous fibers can be changed in accordance with the reinforcing points, it is possible to increase the reinforcing effect. In addition, because the continuous fibers of different types do not mix with each other, it is possible to avoid the loss of the respective properties of the different types of continuous fibers due to the interaction.

(Modification of Second Embodiment)

(1) Although the base resin and the injection molding resin are the same resin as that in the second embodiment, similarly to the first embodiment, the base resin and the injection molding resin may not be the same resin. In this case, the base resin preferably has a compatibility with the injection molding resin. In addition, in a case in which the base resin and the injection molding resin are not the same resin, the base resin preferably has a lower melting point than the injection molding resin.

(2) Although the insert members 50 are arranged at four locations in the spring guide 30 of the second embodiment, it may be possible to employ a configuration in which the insert member(s) 50 may not be arranged at one to three location(s) among the four locations, and only a part of the four locations may be reinforced with the insert member 50. The first insert member 51, the second insert member 52, the third insert member 53, and the fourth insert member 54 can respectively achieve the reinforcing effect individually. Therefore, it is possible to employ a configuration in which only a part of the four locations is reinforced.

(3) Although the first insert member 51 has the bilayer structure in which the first reinforcing portion 511 and the second reinforcing portion 512 are stacked in the second embodiment, it may be possible to employ a configuration in which the spring catcher portion 32 is reinforced by using the first insert member 51 that is formed only of the first reinforcing portion 511 containing the aramid continuous fibers.

(4) Although the second insert member 52 includes the annular ring portion 522, and the continuous fibers are arranged on the end portion of the barrel portion 31 on the second side L1b over the entire circumference in the second embodiment, it may be possible to employ a configuration in which the second insert member 52 is divided in the circumferential direction and the second insert members 52 are arranged only at and in the vicinity of the rotation restriction ribs 36.

(5) Although the third insert member 53 is only arranged at the end portion of the barrel portion 31 on the first side L1a in the second embodiment, the length of the third insert member 53 in the axial direction may be the same as that of the barrel portion 31. In this case, because the third insert member 53 interferes with the fourth insert member 54, it may be possible to employ a configuration in which the third insert member 53 and the fourth insert member 54 are integrated, or the fourth insert member 54 is not arranged. By setting the length of the third insert member 53 in the axial direction so as to be the same as the length of the barrel portion 31, it is possible to reduce variation in the rigidity of the barrel portion 31 in the axial direction. In addition, because a local change in the thickness of the resin portion 39 in the radial direction is small, it is possible to suppress the occurrence of the molding failure.

(6) Although the third insert member 53 is arranged on the outer circumference portion of the barrel portion 31 in the second embodiment, the third insert member 53 may be arranged on the inner circumference portion of the barrel portion 31. In a case in which the third insert member 53 having a barrel shape is arranged on the inner circumference portion of the barrel portion 31, through holes penetrating through the third insert member 53 in the radial direction may be provided, the injection molding resin may be supplied to the inner circumferential side from the through holes during the injection/filling, and thereby, it is possible to form ribs for press-fitting that project from the inner circumferential surface of the third insert member 53 towards the inner circumferential side. With such a configuration, it is possible to fix the cylinder 41a by press-fitting. In addition, by forming the inner circumference portion of the barrel portion 31 with the third insert member 53, it is possible to suppress dimensional change in the inner diameter of the barrel portion due to cooling of the injection molding resin.

(Another Configuration Example of Insert Member for Reinforcing Spring Guide)

Figure 16A:
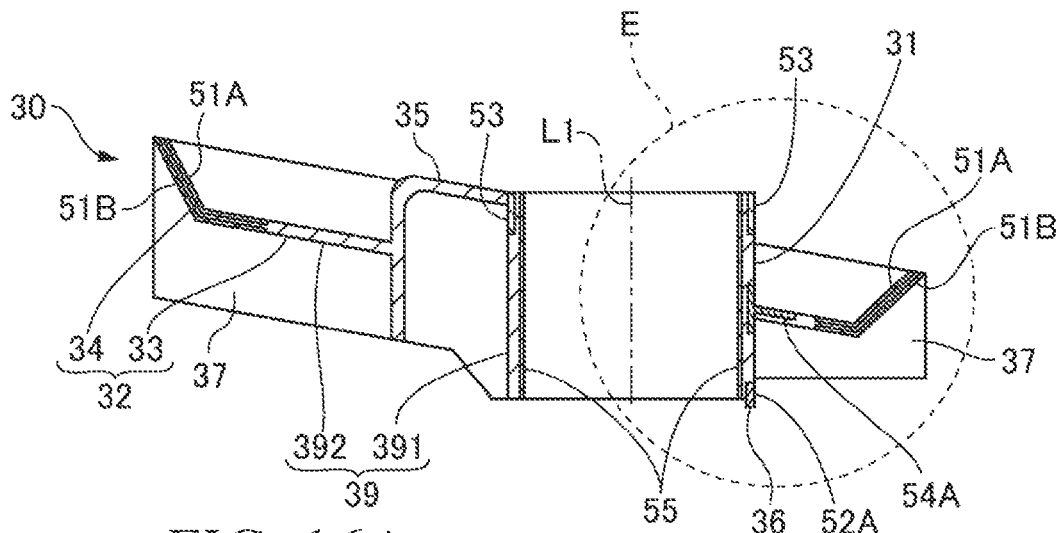
FIG. 16A is a sectional view showing another configuration example of the insert members in the spring guide and shows the cross-sectional position that is same as that shown in FIG. 12A.
Figure 16B:
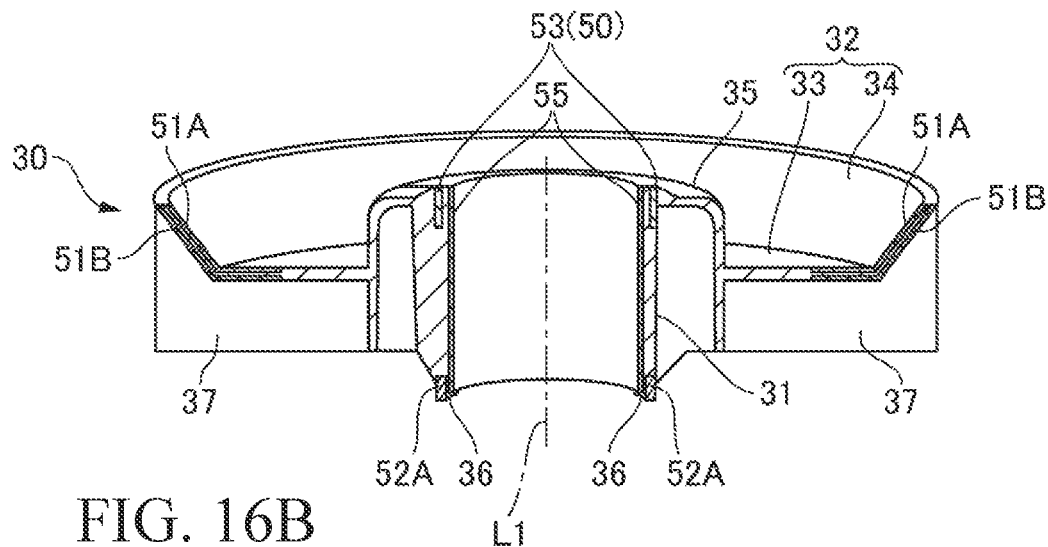
FIG. 16B is a sectional view showing another configuration example of the insert members in the spring guide and shows the cross-sectional position that is same as that shown in FIG. 12B.
Figure 16C:
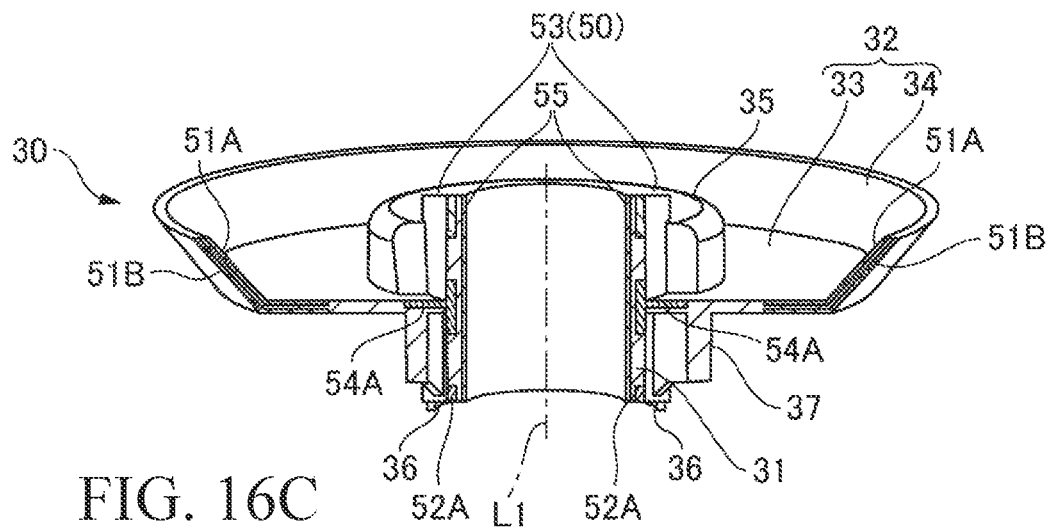
FIG. 16C is a sectional view showing another configuration example of the insert members in the spring guide and shows the cross-sectional position that is same as that shown in FIG. 12C.
Figure 17:
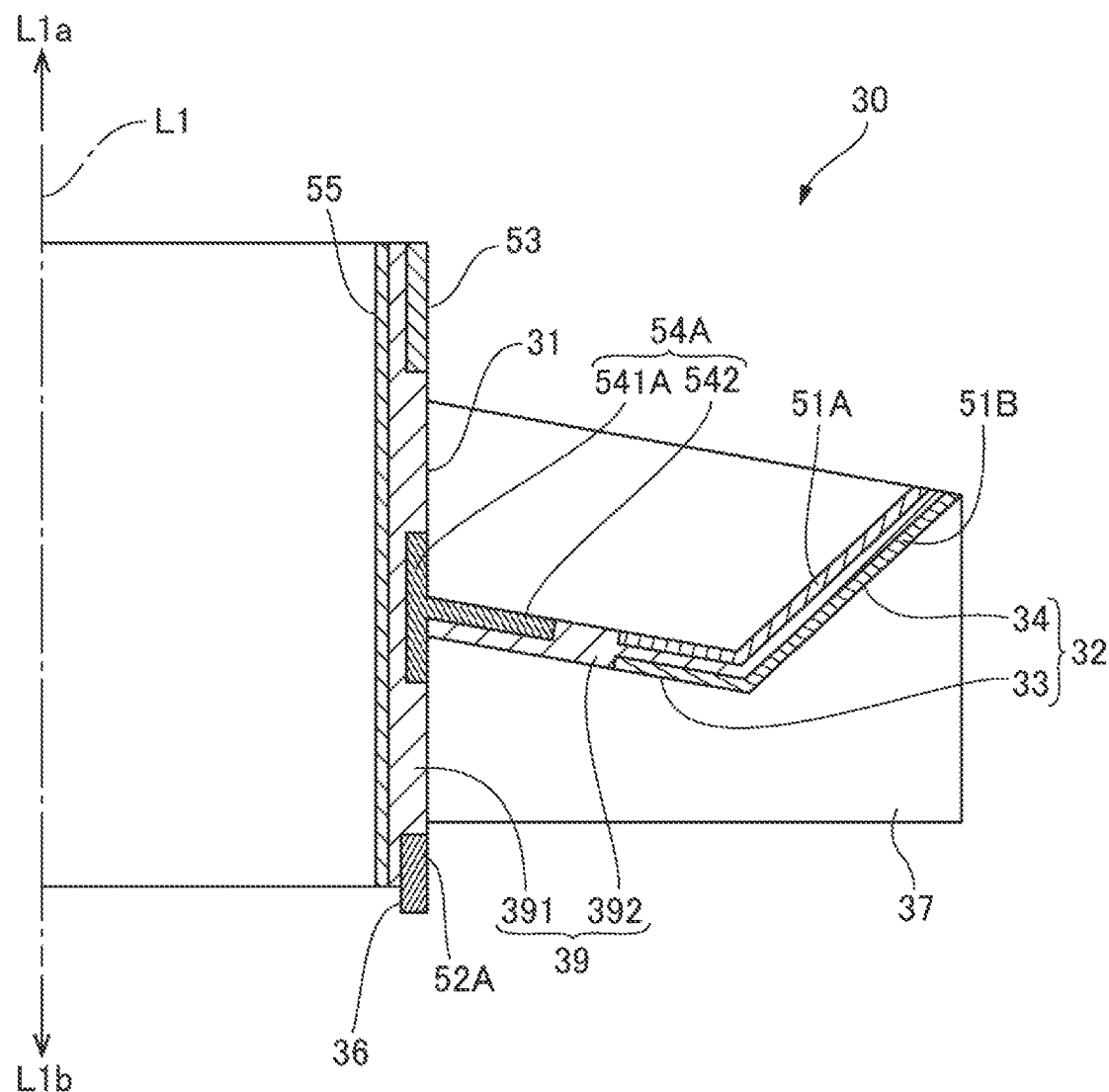
FIG. 17 is a partial enlarged sectional view of a part at which the insert members of another configuration example are arranged.

FIGS. 16A to 16C are sectional views showing another configuration example of the insert members 50 in the spring guide 30 shown in FIG. 8 and are sectional views of the cross-section of the spring guide 30 at the same cross-sectional position as in FIGS. 12A to 12C. FIG. 17 is a partial enlarged sectional view of a part at which the insert members of another configuration example are arranged and is an enlarged view of a region E in FIG. 16A. The spring guide 30 shown in FIG. 16 includes, instead of the first insert member 51 in the above-described embodiment, two first insert members 51A and 51B. In addition, the third insert member 53 is the same as that in the above-described embodiment, and instead of the second insert member 52 and the fourth insert member 54, the spring guide 30 includes a second insert member 52A and a fourth insert member 54A. Furthermore, the spring guide 30 includes a fifth insert member 55 that is arranged on the inner circumference portion of the barrel portion 31.

As shown in FIG. 17, the first insert member 51A contains the aramid continuous fibers and is arranged on the outer circumference portion of the placing portion 33 of the spring catcher portion 32 and on the surface of the outer edge portion 34 on the first side L1a. The first insert member 51B contains the carbon continuous fibers or the glass continuous fibers and is arranged on the outer circumference portion of the placing portion 33 of the spring catcher portion 32 and the surface of the outer edge portion 34 on the second side L1b. Therefore, the outer circumference portion of the spring catcher portion 32 has a structure in which the second resin portion 392 is sandwiched between the first insert members 51A and 51B. In this structure, because the second resin portion 392 is crushed and deformed when it receives the falling impact of the coil spring 43, the impacts can be relaxed. Therefore, the rupture suppressing effect against the falling impact of the coil spring 43 is high.

In the embodiment shown in FIGS. 16 and 17, the outer circumference portion of the end portion of the barrel portion 31 on the first side L1a that is closer to the gates 63 is reinforced with the third insert member 53. The fifth insert member 55 is molded from the molding material that is obtained by adding the short fibers to the base resin, and the fifth insert member 55 is arranged on the inner circumference portion of the barrel portion 31. The length (height) of the fifth insert member 55 in the axial direction is the same as the length of the barrel portion 31 in the axial direction. By reinforcing the inner circumference portion of the barrel portion 31 with the fifth insert member 55, compared with the case in which the inner circumference portion of the barrel portion 31 is manufactured by the injection molding, it is possible to suppress the change in the dimension of the inner diameter of the barrel portion 31 that is caused by the shape change during the cooling of the injection molding resin. Therefore, it is possible to suppress decrease in the strength of fixture of the barrel portion 31 to the cylinder 41a.

The second insert member 52A that reinforces the connecting portion between the rotation restriction ribs 36 and the barrel portion 31 has the thickness in the radial direction that is thinner than that of the second insert member 52 of the above-described embodiment, and the second insert member 52A is arranged on the outer circumference portion of the end portion of the barrel portion 31 on the second side L1b. With such a configuration, it is possible to avoid interference between the second insert member 52A and the fifth insert member 55 that extends to the end portion of the barrel portion 31 on the second side L1b.

The fourth insert member 54A includes a first portion 541A that extends in the axial direction and the second portion 542 that extends from an intermediate position of the first portion 541A in the axial direction towards the outer circumferential side. An end portion of the first portion 541A on the second side L1b extends further towards the second side L1b than the second portion 542. The first portion 541A is arranged on the surface layer portion of the barrel portion 31, and the second portion 542 is arranged on the surface of the coil spring 43 on the seat surface side that receives the falling impact. In this embodiment, because the first portion 541A extends towards both sides in the axial direction relative to the second portion 542, it is possible to effectively suppress the flexure of the placing portion 33 on which the second portion 542 is arranged.

Other Embodiment (1) In a case in which the resin molded member including the insert member, which is manufactured using the 3D printer, has a shape in which a plate thickness is changed locally, by arranging the insert member on the part where the plate thickness is changed locally, it is possible to reduce the change in the thickness of the resin portion. With such a configuration, it is possible to suppress the occurrence of the molding failure when the resin portion is injection molded.

(2) Although the insert member, which is manufactured by using the 3D printer, is arranged on the surface of the resin molded member in each of the above-described embodiments and their modifications, the present invention includes a configuration in which the insert member is not exposed to the surface of the resin molded member. For example, in the spring guide 30 of the second embodiment, for the fourth insert member 54, the first portion 541 may be embedded inside the barrel portion 31, the second portion 542 may be embedded inside the spring catcher portion 32, and the surface thereof may be completely covered with the injection molding resin.

(3) The entire surface or the entire body of the spring guide 30 may be built by using the 3D printer.

Embodiments of this invention were described above, but the above embodiments are merely examples of applications of this invention, and the technical scope of this invention is not limited to the specific constitutions of the above embodiments.

This application claims priority based on Japanese Patent Application No. 2020-205642 filed with the Japan Patent Office on Dec. 11, 2020, the entire contents of which are incorporated into this specification.

The invention claimed is:

1. A manufacturing method of a resin molded member comprising:
an insert member molding step of building an insert member by stacking layers of a base resin containing continuous fibers by using a 3D printer;
an aligning step of aligning the insert member in a cavity of an injection molding mold; and
a resin portion molding step of molding a resin portion integrated with the insert member by filling an injection molding resin into the cavity, wherein
the insert member is arranged on a surface of a weld portion by the resin portion molding step, and the continuous fibers in the insert member are oriented in direction crossing over the weld portion, the weld portion being formed in the resin portion.

2. The manufacturing method of the resin molded member according to claim 1, wherein
a shape of a mold surface of the injection molding mold is transferred to the insert member by resin pressure generated during filling of the injection molding resin into the cavity.

3. A resin molded member comprising:
an insert member in which layers of a base resin containing continuous fibers are stacked; and
a resin portion integrally formed with the insert member, wherein
the insert member is arranged on a surface of a weld portion formed in the resin portion, and
the continuous fibers in the insert member are oriented in direction crossing over the weld portion.

4. The resin molded member according to claim 3, wherein
the insert member is arranged on a surface of the resin portion, and a shape of a mold surface of an injection molding mold is transferred to the insert member, the injection molding mold being configured to mold the resin portion.

5. The resin molded member according to claim 3, wherein
the base resin is any one of a resin same as a resin of the resin portion, a resin compatible with the resin of the resin portion, and a resin having a melting point lower than a melting point of the resin of the resin portion.

6. The resin molded member according to claim 3, wherein
the resin portion contains short fibers.

7. The resin molded member according to claim 3, wherein
the insert member includes a first insert member and a second insert member, and
the continuous fibers contained in the first insert member and the continuous fibers contained in the second insert member are different.

8. The resin molded member according to claim 7, wherein
one of the first insert member and the second insert member contains aramid continuous fibers, and
other of the first insert member and the second insert member contains carbon continuous fibers or glass continuous fibers.

9. The resin molded member according to claim 3, wherein
the insert member includes a plurality of layers, and an orientation of the continuous fibers is uniform for each layer.

10. The resin molded member according to claim 3, wherein the insert member includes a first layer and a second layer stacked on the first layer, and an orientation of the continuous fibers of the first layer and an orientation of the continuous fibers of the second layer are different.

11. The resin molded member according to claim 3, wherein the resin molded member is a resin gear, the resin gear being formed with, at its center, a hole portion through which a rotation shaft passes, and the resin gear being formed with a tooth portion on an outer circumferential surface, the insert member includes a first insert member and a second insert member, an inner circumferential surface of the hole portion is formed of the first insert member, and a surface of the tooth portion is formed of the second insert member, the first insert member contains carbon continuous fibers or glass continuous fibers, and the second insert member contains aramid continuous fibers.

12. The resin molded member according to claim 3, wherein the resin molded member is a spring guide, the spring guide having a barrel portion and a dish-shaped spring catcher portion extending from the barrel portion towards an outer circumferential side, and the insert member is arranged on an outer circumference portion of the spring catcher portion over an entire circumference.

13. The resin molded member according to claim 3, wherein the resin molded member is a spring guide, the spring guide having a barrel portion and a dish-shaped spring catcher portion extending from the barrel portion towards an outer circumferential side, and the insert member is arranged on a connecting portion between the barrel portion and the spring catcher portion.

14. The resin molded member according to claim 12, wherein the insert member contains aramid continuous fibers.

15. The resin molded member according to claim 12, wherein the insert member contains glass continuous fibers or carbon continuous fibers.

16. The resin molded member according to claim 13, wherein the insert member contains aramid continuous fibers.

17. The resin molded member according to claim 13, wherein the insert member contains glass continuous fibers or carbon continuous fibers.

* * * * *